United States Patent
Maruyama et al.

(10) Patent No.: US 8,597,750 B2
(45) Date of Patent: Dec. 3, 2013

(54) POLYESTER RESIN COMPOSITION, METHOD FOR PRODUCING SAME AND MOLDED BODY

(75) Inventors: Katsuya Maruyama, Kanagawa (JP); Kazunobu Maruo, Kanagawa (JP); Tomomichi Kanda, Kanagawa (JP); Tsuneaki Masuda, Kanagawa (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 1139 days.

(21) Appl. No.: 12/282,372

(22) PCT Filed: Mar. 9, 2007

(86) PCT No.: PCT/JP2007/054662
§ 371 (c)(1),
(2), (4) Date: Sep. 10, 2008

(87) PCT Pub. No.: WO2007/105628
PCT Pub. Date: Sep. 20, 2007

(65) Prior Publication Data
US 2009/0092778 A1    Apr. 9, 2009

(30) Foreign Application Priority Data

Mar. 10, 2006 (JP) .................. 2006-065283
Mar. 10, 2006 (JP) .................. 2006-065285
Mar. 10, 2006 (JP) .................. 2006-065286
Mar. 10, 2006 (JP) .................. 2006-065287

(51) Int. Cl.
*C08L 67/02* (2006.01)
*B01J 15/00* (2006.01)

(52) U.S. Cl.
USPC ......... 428/35.7; 428/36.9; 525/420; 525/425; 525/432

(58) Field of Classification Search
USPC .............. 525/420, 425; 428/35.7, 36.9
See application file for complete search history.

(56) References Cited

U.S. PATENT DOCUMENTS

| | | | |
|---|---|---|---|
| 6,121,388 A | 9/2000 | Umetsu | |
| 6,239,233 B1 * | 5/2001 | Bell et al. | 525/425 |
| 2007/0093615 A1 * | 4/2007 | Callander et al. | 525/425 |

FOREIGN PATENT DOCUMENTS

| | | |
|---|---|---|
| EP | 0 964 031 A2 | 12/1999 |
| EP | 1 046 674 A2 | 10/2000 |
| JP | 62-201963 | 9/1987 |
| JP | 01-272660 | 10/1989 |
| JP | 02-060961 | 3/1990 |
| JP | 2000-034357 | 2/2000 |
| JP | 2000-302952 | 10/2000 |
| JP | 2002-294055 | 10/2002 |
| JP | 2002-322353 | 11/2002 |

* cited by examiner

*Primary Examiner* — Ana Woodward
(74) *Attorney, Agent, or Firm* — Antonelli, Terry, Stout & Kraus, LLP.

(57) ABSTRACT

Provided are a resin composition which is colored little and has excellent gas barrier properties, transparency and mechanical properties, a method for producing it, and a shaped article. The composition is a polyester resin composition comprising from 2 to 30% by weight of a specific polyamide resin (A), from 69.5 to 97.99% by weight of a specific polyester resin (B) and from 0.01 to 0.5% by weight of a di- and/or tri-polycarboxylic acid compound (c), which satisfies $a \leq b$, $60 \leq a+b \leq 150$, $1 \leq c \times Cc \leq 20$, $1 \leq c \times Cc/(a \times Ca) \leq 12$ (wherein a is a concentration of the terminal amino group of the polyamide resin (A), b is a concentration of the terminal carboxyl group of the polyamide resin (A), c is a concentration of the carboxyl group in the polycarboxylic acid compound (C), Cc is a concentration of the polycarboxylic acid compound (C) in the polyester resin composition, and Ca is a concentration of the polyamide resin (A) in the polyester resin composition (g/g). The method is for producing the resin composition; and the shaped article is obtained by shaping the resin composition.

17 Claims, No Drawings

POLYESTER RESIN COMPOSITION, METHOD FOR PRODUCING SAME AND MOLDED BODY

TECHNICAL FIELD

The present invention relates to a polyester resin composition comprising a polyamide resin, a polyester resin and a polycarboxylic acid each having specific properties, in a specific ratio, and to a method for producing it; and also to a shaped article such as film, sheet and thin-wall hollow container.

BACKGROUND ART

A polyester resin that comprises an aromatic dicarboxylic acid as a principal dicarboxylic acid ingredient and an aliphatic diol as a principal diol ingredient (hereinafter this may be referred to as "aromatic polyester resin"), such as polyethylene terephthalate (PET) is characterized by having excellent mechanical properties, melt stability, solvent resistance, aroma preservability and recyclability. Accordingly, the aromatic polyester resin is widely utilized for packaging materials such as films, sheets and hollow containers. However, since the gas barrier properties thereof to oxygen, carbon dioxide and the like are not always good, the utilization thereof is limited in applications that require high gas barrier properties. For imparting gas barrier properties to an aromatic polyester resin, there are known a method of laminating it with metal foil such as aluminum, a method of coating or laminating it with any other resin having high gas barrier properties, a method of coating it with aluminum or silicon by vapor deposition. However, these methods are all problematic in that they may detract from transparency, they may require some complicated production step and they may detract from mechanical properties.

For imparting high gas barrier properties to the resin without requiring any complicated production step, there is known a method of mixing the resin with some other resin having high gas barrier properties. The resin having high gas barrier properties may be a polyamide resin such as typically nylon 6 and nylon 66; and in particular, a polyamide resin obtained through polymerization of metaxylylenediamine and adipic acid (hereinafter this may be referred to as "polyamide MXD6") has excellent gas barrier properties. On the other hand, there is known an ethylene/polyvinyl alcohol copolymer resin as another gas-barrier resin than polyamide resin. The ethylene/polyvinyl alcohol copolymer resin is poorly compatible with aromatic polyester resin, and therefore, a composition comprising the two may be cloudy, and in addition, the copolymer resin has other problems in that its crystallinity is high and therefore it detracts from the stretchability of aromatic polyester resin, and its thermal stability is poor.

On the other hand, polyamide MXD6 has high gas barrier properties, and its glass transition temperature, melting point and crystallinity are similar to those of aromatic polyester resin, especially polyethylene terephthalate, and further, the polyamide has excellent thermal stability in melting. Accordingly, its advantages are that it may be readily melt-mixed with aromatic polyester resin, it does not detract from the mechanical properties and the stretchability of aromatic polyester resin, and it may express high gas barrier properties.

However, a composition of an aromatic polyester resin and a polyamide resin such as polyamide MXD6 may give a pearly gloss depending on the dispersion condition and the concentration of the resin composition; and in particular, its glossiness may be more remarkable in thermal forming such as stretching, and its transparency may thereby lower. To that effect, the transparency of the composition of an aromatic polyester resin and a polyamide resin such as polyamide MXD6 is insufficient, and therefore the use of the resin composition in applications requiring high transparency is limited.

Patent Reference 1 proposes a composition prepared by adding a tetracarboxylic acid dianhydride to a mixture comprising a polyamide resin and a polyester resin. Patent Reference 1 has a description relating to the improvement of the mechanical properties of shaped articles used as engineering plastics, but has no description at all relating to a resin composition for films, sheets and thin-wall hollow containers having improved transparency. Patent Reference 2 proposes a compound having an epoxy group and an acid anhydride group as one type of a solubilizing agent for a composition of a thermoplastic polyester resin and a polyamide resin having a metaxylylene group in the main chain thereof. However, the compound obviously differs from the compound in the present invention.

Patent Reference 3 proposes a composition prepared by adding a tetracarboxylic acid dianhydride to a mixture comprising a polyamide resin and a polyester resin. However, the tetracarboxylic acid dianhydride reacts with the polyester resin and the polyamide resin mixed with it. Accordingly, the viscosity of the resin composition may excessively increase during mixing and shaping procedures, and the resin composition may be difficult to shape and work into films, sheets and thin-wall hollow containers. In addition, the dianhydride added may color the composition in yellow to light brown, and has another problem in that it may detract from the appearance of the shaped articles.

Patent Reference 4 proposes a composition prepared by adding a polycarboxylic acid having at least three carboxyl groups in one molecule and its anhydride to a mixture comprising a polyamide resin and a polyester resin. However, for the same reasons as in the above, the polycarboxylic acid anhydride reacts with the polyester resin and the polyamide resin mixed with it; and therefore, the viscosity of the resin composition may excessively increase during mixing and shaping procedures, and the resin composition may be difficult to shape and work into films, sheets and thin-wall hollow containers. In addition, the acid anhydride added may color the composition in yellow to light brown, and has another problem in that it may detract from the appearance of the shaped articles. Accordingly, it is desired to develop a polyester resin composition having high gas barrier properties not requiring the complicated production steps as in the above, and having excellent transparency.

[Patent Reference 1] JP-A 1-272660
[Patent Reference 2] JP-A 62-201963
[Patent Reference 3] JP-A 2000-34357
[Patent Reference 4] JP-A 2000-302952

DISCLOSURE OF THE INVENTION

Problems that the Invention is to Solve

The present invention is to provide a resin composition containing an aromatic polyester resin and a polyamide resin, which has excellent gas barrier properties, transparency and mechanical properties and is hardly colored, and to a method for producing it; and also to provide a shaped article such as a biaxially-stretched hollow container obtained by shaping the resin composition.

Means for Solving the Problems

The present inventors have assiduously studied and, as a result, have found that a resin composition comprising a polyamide resin, a polyester resin and a polycarboxylic acid each having specific properties, in a specific ratio can solve the above-mentioned problems. In addition, the inventors have further found that, when the resin composition is produced according to a specific melt-kneading method, then its coloration may be prevented and its gas barrier properties and transparency may be further improved. Further, the inventors have found that a hollow container obtained by molding the resin composition according to a specific injection-molding process into a precursor (hereinafter this may be referred to as "parison") followed by further shaping it is prevented from coloring and has further improved gas barrier properties and transparency. The invention is based on these findings.

Specifically, the invention is a polyester resin composition comprising:

from 2 to 30% by weight of a polyamide resin (A) in which at least 70 mol % of the diamine constitutive unit is derived from metaxylylenediamine and at least 70 mol % of the dicarboxylic acid constitutive unit is derived from adipic acid, from 69.5 to 97.99% by weight of a polyester resin (B) in which at least 70 mol % of the dicarboxylic acid constitutive unit is derived from an aromatic dicarboxylic acid and at least 70 mol % of the diol constitutive unit is derived from an aliphatic diol, and from 0.01 to 0.5% by weight of a polycarboxylic acid compound (C) comprising at least one tricarboxylic acid compound selected from a group consisting of aromatic tricarboxylic acids, alicyclic tricarboxylic acids and acid anhydrides of those tricarboxylic acids, and/or at least one dicarboxylic acid compound selected from a group consisting of aromatic dicarboxylic acids, alicyclic dicarboxylic acids and acid anhydrides of those dicarboxylic acids (provided that the total of the contents of the ingredients (A), (B) and (C) is 100% by weight).

and satisfying the following formulae (1) to (4):

$$a \leq b \quad (1)$$

$$60 \leq a+b \leq 150 \quad (2)$$

$$1 \leq c \times Cc \leq 20 \quad (3)$$

$$1 \leq c \times Cc/(a \times Ca) \leq 12 \quad (4)$$

wherein a, b, c, Cc and Ca are as follows:
a represents a concentration of the terminal amino group of the polyamide resin (A) (µequivalent/g),
b represents a concentration of the terminal carboxyl group of the polyamide resin (A) (µequivalent/g),
c represents a concentration of the carboxyl group in the polycarboxylic acid compound (C) (µequivalent/g), provided that one equivalent of acid anhydride group is calculated as 2 equivalents of carboxyl group,
Cc represents a concentration of the polycarboxylic acid compound (C) in the polyester resin composition (g/g), and
Ca represents a concentration of the polyamide resin (A) in the polyester resin composition (g/g).

The invention also provides a method for producing the above-mentioned polyester resin composition comprising melt-kneading the polyamide resin (A), the polyester resin (B) and the polycarboxylic acid compound (C), or comprising a step of preparing a preliminary composition by melt-kneading the polyamide resin (A) and the polycarboxylic acid compound (C) followed by a step of melt-kneading the preliminary composition and the polyester resin (B).

The invention further relates to a shaped article obtained by shaping the polyester resin composition.

BEST MODE FOR CARRYING OUT THE INVENTION (1) Polyester Resin Composition:

The polyester resin composition of the invention comprises at least one polyamide resin (A), at least one polyester resin (B) and at least one polycarboxylic acid compound (C) in a predetermined ratio, and satisfies specific conditions. The ingredients are described in detail hereinunder.
Polyamide Resin (A):

The polyamide resin (A) is obtained through polycondensation of a diamine and a dicarboxylic acid. In this, at least 70 mol % of the diamine constitutive unit is derived from metaxylylenediamine, and at least 70 mol % of the dicarboxylic acid constitutive unit is derived from adipic acid. The metaxylylenediamine-derived constitutive unit must account for at least 70 mol %, but preferably at least 80 mol %, more preferably at least 90 mol % (including 100 mol %). When the metaxylylenediamine-derived constitutive unit is less than 70 mol %, then the gas barrier properties may be insufficient. The adipic acid-derived constitutive unit must account for at least 70 mol %, but preferably at least 80 mol %, more preferably at least 90 mol % (including 100 mol %). When the adipic acid-derived constitutive unit is less than 70 mol %, the gas barrier properties may worsen and the crystallinity may excessively lower. As the polyamide resin (A), preferred is polymetaxylylenadipamide. The polyamide resin having the monomer composition and the constitutive unit profile mentioned above is similar to a polyester resin such as polyethylene terephthalate resin in point of the shaping processability, and is therefore advantageous as not detracting from the processability of the polyester resin composition.

Other diamines than metaxylylenediamine usable herein include paraxylylenediamine, 1,3-bis(aminomethyl)cyclohexane, 1,4-bis(aminomethyl)cyclohexane, tetramethylenediamine, hexamethylenediamine, nonamethylenediamine and 2-methyl-1,5-pentanediamine, to which, however, the invention should not be limited.

Other dicarboxylic acids than adipic acid usable herein include suberic acid, azelaic acid, sebasic acid, 1,10-decanedicarboxylic acid, terephthalic acid, isophthalic acid and 2,6-naphthalenedicarboxylic acid, to which, however, the invention should not be limited.

A small amount of a monoamine or a monocarboxylic acid may be added as a molecular weight-controlling agent in polycondensation to produce the polyamide resin (A).

Preferably, the polyamide resin (A) is produced through polycondensation in melt (hereinafter this may be referred to as "melt polycondensation"). For example, this is preferably produced according to a method that comprises heating a nylon salt of metaxylylenediamine and adipic acid according to a pressure process in the presence of water, and polymerizing it in melt with removing the added water and the condensed water. It may also be produced according to a method that comprises directly adding metaxylylenediamine to a melt of adipic acid followed by polycondensing it under normal pressure. In this case, in order that the reaction system could be kept in a uniform liquid state, metaxylylenediamine is continuously added to adipic acid to attain the polycondensation, and during this, the reaction system is preferably heated so that the reaction temperature could not be lower than the melting point of the formed oligoamide and polyamide. The polyamide obtained through the melt polycondensation may be further subjected to solid-phase polymerization to increase the molecular weight thereof. The thus-obtained, solid-phase polymerization polyamide may be used as the polyamide resin (A).

The polyamide resin (A) satisfies the following relational formulae (1) and (2) in point of the terminal amino acid concentration a (µequivalent/g) and the terminal carboxyl group concentration b (µequivalent/g):

$$a \leq b \quad (1)$$

$$60 \leq a+b \leq 150 \quad (2).$$

When the resin does not satisfy the formula (1), then it may be difficult to prevent the coloration of the polyester resin composition.

When the resin does not satisfy the formula (2), its reactivity with the polycarboxylic acid compound (C) and the polyester resin (B) to be mentioned below may be insufficient. In addition, a polyester resin composition in which the polyamide resin (A) is dispersed finely and which has excellent transparency and mechanical properties may be difficult to obtain. When (a+b) in formula (2) is less than 60, then sufficient reactivity could not be obtained. When (a+b) is more than 150, the reactivity with the polycarboxylic acid compound (C) may increase; however, the affinity to the polyester resin (B) may lower and, in addition, the viscosity may excessively lower and the dispersibility of the polyamide resin (A) may lower.

The concentration of the polyamide resin (A) in the polyester resin composition may be from 2 to 30% by weight relative to the total weight of the polyamide resin (A), the polyester resin (B) and the polycarboxylic acid compound (C), preferably from 2 to 20% by weight, more preferably from 2 to 15% by weight, even more preferably from 2 to 10% by weight, still more preferably from 2 to 5% by weight. When the concentration is less than 2% by weight, good gas barrier properties could not be obtained. When it is more than 30% by weight, then gas barrier properties may be good, but the transparency of the shaped packaging article may lower and the mechanical properties thereof may also worsen, and the commercial value thereof may be low.

The relative viscosity of the polyamide resin (A) (1 g of the polyamide resin is dissolved in 100 ml of 96% sulfuric acid, and its viscosity is measured at 25° C.) is preferably from 1.83 to 4.20, more preferably from 2.02 to 4.20, even more preferably from 2.30 to 4.20. When the relative viscosity falls within the above range, then the flowability of the resin melt in shaping the polyester resin composition of the invention into films, sheets, hollow containers or the like is good, therefore reducing die swelling and melt unevenness and bettering the shapability of the resin composition. In addition, the transparency of the shaped article may be improved, and the transparency reduction owing to whitening in high-humidity atmosphere may be inhibited.

The polyamide resin (A) having a relative viscosity of at least 2.30 may be readily obtained by continuing the reaction until the relative viscosity could reach a predetermined value in melt polymerization. However, when the reaction of melt polymerization is continued until the level of a predetermined relative viscosity, the time (reaction time) of keeping the melt condition may be long and the polyamide molecules may be thereby damaged or abnormal reaction (three-dimensional polymerization) such as non-linear molecular growth may occur, thereby forming gel or fish eyes. A shaped article of a polyester resin composition comprising the polyamide resin with much gel and fish eyes may have fish eyes and its producibility may be thereby lowered.

The polyamide resin (A) having a relative viscosity of at least 2.30 may be favorably produced according to a method that comprises preparing a polyamide resin having a relative viscosity of at most 2.28 through melt polymerization with inhibiting the generation of fish eyes owing to the increase in the thermal history in melt polymerization, then subjecting the melt polymerization polyamide resin to solid-phase polymerization thereby to make the resin have a relative viscosity of at least 2.30. The solid-phase polymerization may be attained by heating the pellets or powder of the melt polymerization polyamide resin having a relative viscosity of from 1.83 to 2.28 under reduced pressure or in an inert gas atmosphere at a temperature falling within a range of from 120° C. to lower than the melting point of the polyamide resin. After the solid-phase polymerization, the relative viscosity of the solid-phase polymerization polyamide resin is preferably from 2.30 to 4.20.

The polyester resin composition comprising the polyamide resin (A) having an increased relative viscosity of at least 2.30 through solid-phase polymerization may have extremely good shapability into shaped articles such as films, sheets, hollow containers. In addition, since the solid-phase polymerization polyamide resin has few fish eyes, the fish eyes to be caused by the polyamide rein in the shaped articles could be reduced and the producibility may be noticeably improved.

The moisture content of the polyamide resin (A) is preferably at most 0.15% by weight, more preferably at most 0.1% by weight, even more preferably from 0.01 to 0.09% by weight. In this case, the polyamide resin may be dried so as to have the moisture content falling within the above range. When the moisture content is at most 0.15% by weight, the hydrolysis of the polyester resin (B), which may be caused by water from the polyamide resin (A) in melt mixing with the polyester resin (B), may be inhibited. The polyamide resin may be dried in any conventional known method. For example, herein employable is a method of keeping the vent hole under reduced pressure in melt extrusion of the polyamide resin through a vented extruder, to thereby remove water from the polyamide resin; or a method of feeding the polyamide resin into a tumbler (rotary vacuum tank) and heating and drying it under reduced pressure at a temperature lower than the melting point of the polyamide resin. However, the invention should not be limited to these.

Preferably, the polyamide resin (A) has a melt viscosity of from 100 to 2000 Pa·s at 270° C. and at a shear rate of 100/sec. The polyamide (A) having a suitable viscosity within the above range has good dispersibility in polyester resin and therefore may more improve the transparency and the mechanical properties of the shaped article.

The polyamide resin (A) may contain a phosphorus compound for increasing the process stability in melt shaping or for preventing the coloration of the polyamide resin. As the phosphorus compound, favorably used is a phosphorus compound containing an alkali metal or an alkaline earth metal. For example, it includes sodium, magnesium or calcium phosphates, hypophosphites and phosphites; and those containing an alkali metal or alkaline earth metal hypophosphite are favorably used as especially excellent in the effect of preventing polyamide coloration. The concentration of the phosphorus compound in the polyamide resin (A) is preferably at most 200 ppm as the phosphorus atom, more preferably at most 160 ppm, even more preferably at most 100 ppm. When the phosphorus atom concentration in the polyamide resin (A) is at most 200 ppm and when the resin is mixed in melt with a polyester resin produced by the use of an antimony catalyst, the mixture may be prevented from being blackened owing to the reduction of the antimony catalyst slightly remaining in the polyester resin. In addition to the above-mentioned phosphorus compound, the polyamide resin (A) may further contain lubricant, mat agent, heat-resistant stabilizer, UV absorbent, nucleating agent, plasticizer, flame retardant, antistatic agent, coloration inhibitor, gellation inhibitor and other additives within the range thereof not detracting from the effect of the invention.

Polyester Resin (B):

The polyester resin (B) may be obtained through polymerization of a dicarboxylic acid and a diol. In this, at least 70 mol % of the dicarboxylic acid constitutive unit is derived from an aromatic dicarboxylic acid, and at least 70 mol % of the diol constitutive unit is derived from an aliphatic diol. The proportion of the constitutive unit derived from an aromatic dicarboxylic acid is at least 70 mol %, preferably at least 80 mol %, more preferably at least 90 mol % (including 100 mol %). The proportion of the constitutive unit derived from an aliphatic diol is at least 70 mol %, preferably at least 80 mol %, more preferably at least 90 mol % (including 100 mol %). When the constitutive unit derived from an aromatic dicarboxylic acid is less than 70 mol %, then the heat resistance of the shaped article may lower. When the constitutive unit derived from an aliphatic diol is less than 70 mol %, the shapability may worsen.

The aromatic dicarboxylic acid includes terephthalic acid, isophthalic acid, 2,6-naphthalenedicarboxylic acid; naphthalenedicarboxylic acids such as 1,5-naphthalenedicarboxylic acid, 2,7-naphthalenedicarboxylic acid; 4,4'-biphenyldicarboxylic acid, 3,4'-biphenyldicarboxylic acid, and their ester-forming derivatives. Within a range not detracting the object of the invention, an aliphatic dicarboxylic acid such as adipic acid or sebasic acid, or a monocarboxylic acid such as benzoic acid, propionic acid or butyric acid may be used.

The aliphatic diol includes ethylene glycol, 1,3-propylene glycol, 1,4-butanediol, 1,4-cyclohexanedimethanol, 1,6-hexanediol, and their ester-forming derivatives. Within a range not detracting from the object of the invention, monoalcohols such as butyl alcohol, hexyl alcohol, octyl alcohol; and polyalcohols such as trimethylolpropane, glycerin, pentaerythritol may also be used.

For producing the polyester resin (B), employable is any known method of direct esterification or interesterification. The polycondensation catalyst to be used in producing the polyester resin (B) includes known antimony compounds such as antimony trioxide, antimony pentoxide; germanium compounds such as germanium oxide; titanium compounds such as titanium acetate; aluminium compounds such as aluminium chloride, to which, however, the invention should not be limited.

Preferred examples of the polyester resin (B) are polyethylene terephthalate resin, polyethylene terephthalate/isophthalate copolymer resin, polyethylene/1,4-cyclohexanedimethylene terephthalate copolymer resin, polyethylene 2,6-naphthalenedicarboxylate resin, polyethylene 2,6-naphthalenedicarboxylate/terephthalate copolymer resin, polyethylene terephthalate/4,4'-biphenyldicarboxylate resin, poly-1,3-propylene terephthalate resin, polybutylene terephthalate resin, polybutylene 2,6-naphthalenedicarboxylate resin. More preferred examples of the polyester resin (B) are polyethylene terephthalate resin, polyethylene terephthalate/isophthalate copolymer resin, polyethylene/1,4-cyclohexanedimethylene terephthalate copolymer resin, polybutylene terephthalate resin, and polyethylene 2,6-naphthalenedicarboxylate resin.

The moisture content of the polyester resin (B) (before melt kneading) is preferably at most 200 ppm, more preferably from 80 to 200 ppm, even more preferably from 80 to 100 ppm. A polyester resin may be dried to have the above-mentioned moisture content. Having a moisture content falling within the range, the polyester resin does not hydrolyze in the melt-kneading process, and its molecular weight may be prevented from being extremely lowered and the resin may be prevented from yellowing.

Not specifically defined, the intrinsic viscosity of the polyester resin (B) (measured in a mixed solvent of phenol/1,1,2,2-tetrachloroethane=60/40 by weight at 25° C.) is preferably from 0.5 to 1.5 dl/g, more preferably from 0.6 to 1.3 dl/g. Having the intrinsic viscosity falling within the range, the polyester resin may have a sufficiently high molecular weight, and may form a shaped articles having mechanical properties needed in various applications.

The concentration of the polyester resin (B) in the polyester resin composition is from 69.5 to 97.99% by weight relative to the total weight of the polyamide resin (A), the polyester resin (B) and the polycarboxylic acid compound (C), preferably from 79.6 to 97.99% by weight, more preferably from 84.8 to 97.99% by weight, even more preferably from 90 to 97.99% by weight, still more preferably from 95 to 97.99% by weight. When the concentration oversteps the range of from 69.5 to 97.99% by weight, then excellent gas barrier properties, transparency and mechanical properties could not be obtained.

Polycarboxylic Acid Compound (C):

The polycarboxylic acid compound (C) comprises at least one tricarboxylic acid compound selected from aromatic tricarboxylic acids alicyclic tricarboxylic acids and their acid anhydrides, and/or at least one dicarboxylic acid compound selected from aromatic dicarboxylic acids, alicyclic dicarboxylic acids and their acid anhydrides. The acid anhydrides are intramolecular acid anhydrides.

The tricarboxylic acid compound includes trimellitic acid, trimellitic acid anhydride, hemimellitic acid and its anhydride, trimesic acid, 1,2,4-cyclohexanetricarboxylic acid and its anhydride, 1,2,3-cyclohexanetricarboxylic acid and its anhydride, 1,3,5-cyclohexanetricarboxylic acid, naphthalenetricarboxylic acid (including position isomers) and its anhydride, anthracenetricarboxylic acid (including position isomers) and its anhydride, biphenyltricarboxylic acid (including position isomers) and its anhydride, benzophenonetricarboxylic acid (including position isomers) and its anhydride. Preferred are trimellitic acid anhydride, trimellitic acid, 1,2,4-cyclohexanetricarboxylic acid and its anhydride; and more preferred are trimellitic acid anhydride and trimellitic acid; and even more preferred is trimellitic acid anhydride.

The dicarboxylic acid compound includes, for example, phthalic acid, phthalic acid anhydride, isophthalic acid, terephthalic acid, naphthalenedicarboxylic acid (including position isomers) and its anhydride, anthracenedicarboxylic acid (including position isomers) and its anhydride, biphenyldicarboxylic acid (including position isomers) and its anhydride, benzophenonedicarboxylic acid (including position isomers) and its anhydride, cyclohexanedicarboxylic acid (including position isomers) and its anhydride. Preferred are phthalic acid and phthalic acid anhydride; and more preferred is phthalic acid anhydride.

The polycarboxylic acid compound (C) satisfies the following relational formulae (3) and (4):

$$1 \leq c \times Cc \leq 20 \quad (3)$$

$$1 \leq c \times Cc/(a \times Ca) \leq 12 \quad (4)$$

wherein a, c, Cc and Ca are as follows:
a represents the terminal amino group concentration of the polyamide resin (A) (μequivalent/g),
c represents the concentration of the carboxyl group in the polycarboxylic acid compound (C) (μequivalent/g), provided that one equivalent of acid anhydride group is calculated as 2 equivalents of carboxyl group,
Cc represents the concentration of the polycarboxylic acid (C) in the polyester resin composition (g/g), and
Ca represents the concentration of the polyamide resin (A) in the polyester resin composition (g/g).

c×Cc in formula (3) is preferably from 1 to 15, more preferably from 1 to 10. Falling within the range, the reactivity of the acid with the polyamide resin (A) and with the polyester resin (B) is good, and in addition, since the acid does not cause any excess viscosity increase, the transparency of the obtained shaped article may increase.

c×Cc/(a×Ca) in formula (4) is preferably from 1 to 10, more preferably from 1 to 8. Falling within the range, the reactivity of the acid with the polyamide resin (A) is good, and since the acid does not cause any excess viscosity increase, the transparency of the obtained shaped article may increase.

The concentration of the polycarboxylic acid compound (C) in the polyester resin composition may be from 0.01 to 0.5% by weight relative to the total weight of the polyamide resin (A), the polyester resin (B) and the polycarboxylic acid compound (C), preferably from 0.01 to 0.3% by weight, more preferably from 0.01 to 0.2% by weight, even more preferably from 0.01 to 0.1% by weight, still more preferably from 0.01 to 0.07% by weight. When the concentration falls outside the range of from 0.01 to 0.5% by weight, excellent gas barrier properties, transparency and mechanical properties could not be obtained.

The polycarboxylic acid compound (C) may be a mixture of a dicarboxylic acid compound and a tricarboxylic acid compound, but the individual carboxylic acid compounds may be used singly. In case where the two carboxylic acid compounds are combined and used, their blend ratio may be determined in any desired manner.

Preferably, (melt viscosity of polyamide resin (A))/(melt viscosity of polyester resin (B)) is from 0.3 to 1.2. The melt viscosity is measured at an apparent shear rate of 100/sec and at 270° C. When the ratio falls within the range, then shaped articles having more excellent transparency can be obtained.

In a preferred embodiment of the invention, the polyester resin composition comprises from 2 to 15% by weight of the polyamide resin (A), from 84.8 to 97.99% by weight of the polyester resin (B) and from 0.01 to 0.2% by weight of a tricarboxylic acid compound (the total of % by weight is 100% by weight). The content of the polyamide resin (A) is preferably from 2 to 10% by weight, more preferably from 2 to 5% by weight. The content of the polyester resin (B) is preferably from 90 to 97.99% by weight, more preferably from to 97.99% by weight. The content of the tricarboxylic acid compound is preferably from 0.01 to 0.1% by weight, more preferably from 0.01) 0.07% by weight.

In another preferred embodiment of the invention, the polyester resin composition comprises from 2 to 30% by weight of the polyamide resin (A), from 69.5 to 97.99% by weight of the polyester resin (B), from 0.01 to 0.5% by weight of a dicarboxylic acid compound and from 0 to 0.3% by weight of a tricarboxylic acid compound (in which the total of the dicarboxylic acid compound and the tricarboxylic acid compound is from 0.01 to 0.5% by weight). The total of % by weight of those ingredients is 100% by weight. The content of the polyamide resin (A) is preferably from 2 to 20% by weight, more preferably from 2 to 15% by weight. The content of the polyester resin (B) is preferably from 79.6 to 97.99% by weight, more preferably from 84.7 to 97.99% by weight. The content of the dicarboxylic acid compound is preferably from 0.01 to 0.3% by weight, more preferably from 0.01 to 0.2% by weight. The content of the tricarboxylic acid compound is preferably from 0 to 0.2% by weight, more preferably from 0 to 0.1% by weight. The total amount of the dicarboxylic acid compound and the tricarboxylic acid compound (the total amount of the polycarboxylic acid compound (C)) is preferably from 0.01 to 0.3% by weight, more preferably from 0.01 to 0.2% by weight. The polycarboxylic acid compound (C) is most preferably trimellitic acid anhydride, and apart from it, the compound is preferably phthalic acid anhydride, trimellitic acid, phthalic acid and other polycarboxylic acid compounds in that order.

(2) Production of Polyester Resin Composition:

The polyester resin composition of the invention may be produced according to the following production methods.

The order of melt-mixing the polyamide resin (A), the polyester resin (B) and the polycarboxylic acid compound (C) is not specifically defined. For melt-kneading them, for example, employable are the following methods.

(i) A polyamide resin (A), a polyester resin (B) and a polycarboxylic acid compound (C) are melt-kneaded all at a time.

(ii) A polyamide resin (A), a polyester resin (B) and a polycarboxylic acid compound (C) are melt-kneaded all at a time to prepare a preliminary composition (master batch), and then the preliminary composition is further melt-kneaded with a polyester resin (B) (polyester resin (B) for dilution) to give a polyester resin composition (master batch method).

(iii) A polyester resin (B) and a polycarboxylic acid compound (C) are previously melt-kneaded, and then this is melt-kneaded with a polyamide resin (A).

(iv) A polyamide resin (A) and a polycarboxylic acid compound (C) are melt-kneaded to prepare a preliminary composition, and then the preliminary composition is further melt-kneaded with a polyester resin (B).

The methods (ii) and (iv) are preferred, and the method (ii) is more preferred. In the master batch method (ii), it is desirable that a preliminary composition comprising from 10 to 40% by weight of a polyamide resin (A), from 59.00 to 89.95% by weight of a polyester resin (B) and from 0.05 to 1% by weight of a polycarboxylic acid compound (C) (the total % by weight of the ingredients (A), (B) and (C) is 100% by weight) is prepared, and then a mixture comprising, for example, from 5 to 50% by weight of the preliminary composition and from 50 to 95% by weight of a polyester resin (B) for dilution is melt-kneaded thereby to produce the polyester resin composition of the invention having the defined composition ratio.

The polyester resin (B) for dilution may be the same as or different from the polyester resin (B) in the preliminary composition. In case where the two differ, it is desirable that the preliminary composition (master batch) and the polyester resin for dilution satisfy the following formulae (5) and (6):

$$100 \leq x \leq 250 \quad (5)$$

$$0.1 \leq x/y \leq 0.5 \quad (6)$$

(wherein x represents the melt viscosity of the preliminary composition measured at 270° C. and at a shear rate of 100/sec (Pa·s); and y represents the melt viscosity of the polyester resin (B) for dilution measured under the same condition (Pa·s)).

The preliminary composition (master batch) satisfying the formula (5) has a suitable viscosity, and therefore, when it is melt-kneaded with a polyester resin (B) for dilution, the polyamide resin (A) could disperse more finely and the transparency and the mechanical properties of the obtained shaped articles may be bettered. Using the polyester resin (B) for dilution that satisfies the formula (6) betters the fine dispersion in melt kneading and, in addition, it reduces resin deterioration or coloration owing to overheating.

For melt-kneading the ingredients, for example, herein employable is a method of dry-blending the polyamide resin (A), the polyester resin (B) and the polycarboxylic acid (C) in a tumbler, a V-shaped blender or a Henschel mixer; a method of further melt-kneading the dry-blended mixture once or more in a single-screw extruder, a twin-screw extruder or a kneader; or a method of optionally processing the melted mixture for solid-phase polymerization in high vacuum or in an inert gas atmosphere. Of those, preferred is the method of melt-kneading the ingredients by the use of a twin-screw extruder.

In case where the polyamide resin (A), the polyester resin (B) and the polycarboxylic acid compound (C) are melt-kneaded in a twin-screw extruder, the melt-kneading temperature is preferably from 200 to 300° C., more preferably from 220 to 290° C. When a combination of counter-screw elements and kneading discs is used in the screw zone in the extruder, then the ingredients may be efficiently dispersed.

Preferably, the polyamide resin (A) is finely dispersed in the polyester resin composition of the invention since shaped articles having good transparency can be obtained. For example, in shaped articles before secondary processing for stretching and thermoforming, such as parisons, unstretched sheets or unstretched films, the mean dispersed particle size of the polyamide resin (A) is preferably from 0.05 to 0.35 µm, more preferably from 0.05 to 0.20.

The polyester resin composition of the invention may contain any other resin, as well as additives such as pigment, dye, carbon black, lubricant, mat agent, heat-resistant stabilizer, weather-resistant stabilizer, UV absorbent, fluorescent whitener, nucleating agent, plasticizer, flame retardant, antistatic agent, alkali compound for preventing gellation of polyamide resin, etc., within a range not detracting from the effect of the invention. Preferably, the amount of the other resin is at most 20% by weight relative to the total amount of the polyester resin composition; and the total of the additives is preferably at most 5% by weight. The other resin includes, for example, polyester resins such as polyethylene naphthalate resin, polybutylene terephthalate resin; polyamide resins such as nylon-6, nylon-6IT, nylon-66; and polyolefins such as polyethylene, polypropylene.

To the polyester resin composition of the invention, it is possible to add a recycled polyester and/or a recycled polyamide resin selected from recycled matter of polyethylene terephthalate products, recycled matter of modified polyethylene terephthalate products containing a small amount of isophthalic acid units, recycled matter of polyamide products, wastes and substandard products in shaped article production, within a range not intrinsically changing the properties of the composition.

(3) Shaped Article:

The shaped article of the invention is obtained by shaping the above-mentioned polyester resin composition. As so described hereinabove, the polyester resin composition of the invention can be used as a material for shaped articles that require high transparency. The shaped articles include, for example, unstretched or low-ratio stretched single-layered sheets and multilayered sheets obtained in a T-die process or a coextrusion process; films obtained by stretching the sheets; low-ratio deep-drawn containers obtained from the sheets; and unstretched or stretched thin-wall hollow containers having a body wall thickness of from 0.1 to 2 mm obtained according to direct blow molding or stretch blow molding. These shaped articles can be used as packaging materials for foods, drinks, chemicals, electronic parts, etc.

For the shaped article of the polyester resin composition of the invention, the dispersed particle size of the polyamide resin in the parison prepared by injection-molding under a specific condition may be reduced. A biaxially-stretched hollow container obtained by processing the parison in a mode of biaxial-stretch blow molding may have good transparency.

The biaxially-stretched hollow container may be obtained by injecting the above-mentioned polyester resin composition into the mold cavity of an injection-molding machine via the mold hot runner from the injection cylinder, thereby preparing a parison, and further processing the parison in a mode of biaxial-stretch blow molding.

The injection-molding condition for obtaining the parison, which is a precursor of a biaxially-stretched hollow container, preferably satisfies the following (a) to (e):
(a) resin temperature: 260 to 290° C.,
(b) screw back pressure: 2.5 to 5.0 MPa,
(c) screw speed: 80 to 250 rpm,
(d) injection speed: 80 to 180 cc/sec,
(e) mold temperature: 10 to 25° C.

The above-mentioned injection condition includes the data indicated by the instruments of the injection-molding device. In case where instruments are not installed in the injection-molding device, the data may be derived from those set in a process of injection molding with an injection-molding machine of the same type.

In the parison formed under the above condition, the dispersed particle size of the polyamide resin (A) in the polyester resin composition is small, and the dispersed particle size thereof fluctuates little, and accordingly, the transparency of the biaxially-stretched hollow container from it may be good. The mean diameter of the dispersed particles of the polyamide resin (A) in the polyester resin composition in an area of the body part of the parison is preferably from 0.05 to 0.20 µm. Also preferably, at least 60% of the dispersed particles have a particle size falling within a range of ±0.05 µm of the mean particle size.

The dispersed particle size of the polyamide resin (A) in the polyester resin composition is principally influenced by the condition in metering and injection. Specifically, when the screw back pressure is high and the screw speed is rapid in metering, then the kneading of the melted resin is promoted and the dispersed particle size is reduced. When the injection speed is high, then shear force is given to the melted resin and the dispersed particle size is reduced. However, when only the injection speed is increased, then only the mean value of the dispersed particle size may be reduced, and the polyamide resin may contain particles having a relatively large dispersed particle size. On the other hand, in metering, when only the back pressure is increased and the screw speed is elevated, then a uniform dispersed particle size may be obtained, but as compared with that in a case where the injection speed is increased, the mean dispersed particle size in this case may be large. Accordingly, by suitably combining the screw speed, the back pressure and the injection speed, the dispersed particle size of the polyamide resin (A) may be uniformly reduced.

The injection-molding condition (a) to (e) may be suitably selected in accordance with the melt viscosity of the resin to be shaped.

When the resin temperature is from 260 to 290° C., it is possible to prevent a non-melted matter from precipitating in the parison and to prevent the transparency of the parison from lowering. In addition, it is also possible to prevent the parison from yellowing and to prevent the appearance of the biaxially-stretched hollow container from worsening. When the mold temperature is from 10° C. to 25° C., then it is possible to prevent the appearance of the container from worsening owing to the crystallization thereof. In addition, the transparency of the biaxially-stretched hollow container may be bettered.

For forming a biaxially-stretched hollow container from the obtained parison, usable is an ordinary blow molding machine.

For example, using a biaxial-stretch blow molding machine, a parison is heated with an IR heater for 15 seconds to 4 minutes so as to make it have a surface temperature of from 90 to 120° C., then this is blow-molded with a stretch rod and under a pressure of from 0.5 to 3.5 MPa, thereby giving the intended container.

The shaped article of the invention has excellent gas barrier properties, transparency and mechanical properties. For example, a 500-ml bottle may have an oxygen transmission rate at 23° C. and 60% RH of at most 0.035 cc/bottle·day·0.21 atm, a haze value of at most 8% (thickness, 300 μm), and an yellow index (YI) of at most 12.

The shaped articles such as film, sheet and biaxially-stretched hollow container of the invention have excellent gas barrier properties and have excellent color tone and transparency. For example, they may be used for storing various substances such as liquid drinks; seasonings; pasty foods; liquid foods; processed rice products, high-water content foods; low-water content foods; solid or liquid chemicals; liquid and pasty medicines; cosmetics, skin care products, etc.

EXAMPLES

The invention is described concretely with reference to the following Examples and Comparative Examples; however, the invention should not be limited to the following Examples. The evaluation methods employed in Examples and Comparative Examples are as Follows:

(1) Concentration of Terminal Amino Group of Polyamide [$NH_2$] (μequivalent/g):

From 0.3 to 0.5 g of polyamide is accurately measured, and dissolved in 30 cc of a solution of phenol/ethanol=4/1 (by volume) by stirring at 20 to 30° C. After completely dissolved, this is titrated for neutralization with N/100 aqueous hydrochloric acid solution with stirring, thereby determining the intended concentration.

(2) Concentration of Terminal Carboxyl Group of Polyamide [COOH] (μequivalent/g):

From 0.3 to 0.5 g of polyamide is accurately measured, and dissolved in 30 cc of benzyl alcohol by stirring in a nitrogen flow at 160 to 180° C. After completely dissolved, this is cooled in a nitrogen flow to 80° C. or lower, and with stirring, 10 cc of methanol is added thereto, and this is titrated for neutralization with N/100 aqueous sodium hydroxide solution, thereby determining the intended concentration.

(3) Relative Viscosity:

One g of polyamide is accurately measured, and dissolved in 100 ml of 96% sulfuric acid with stirring at 20 to 30° C. After completely dissolved, 5 cc of the solution is immediately taken in a Canon-Fenske viscometer, and left in a thermostat at 25° C. for 10 minutes, and then its dropping speed (t) is measured. On the other hand, the dropping speed of 96% sulfuric acid itself ($t_0$) is also measured. From t and $t_0$, the relative viscosity is derived through calculation according to the following formula:

Relative Viscosity=$t/t_0$.

(4) Moisture Content (% by Weight):

Using Mitsubishi Chemical's Karl Fischer micromoisture meter (CA-05 Model) and vaporizer (VA-05 model), the amount of water in a sample is measured under a vaporization condition at the melting temperature for 30 minutes, and the moisture content of the sample is determined.

(5) Yellow Index YI:

Determined according to JIS K-7105. For the measurement, Nippon Denshoku Kogyo's haze meter (Model COH-300A) is used.

(6) Haze (Thickness: 300 μm (Bottle), 20 μm (Film):

Determined according to JIS K-7105. For the measurement, Nippon Denshoku Kogyo's haze meter (Model COH-300A) is used.

(7) Oxygen Transmission Rate and Oxygen Transmission Coefficient

Determined according to ASTM D3985. Using Modern Controls' device (Model OX-TRAN2/21), a bottle is analyzed at a temperature of 23° C. under the condition that the relative humidity inside the bottle is 100% and the relative humidity in the ambient atmosphere is 50%. The oxygen transmission coefficient of a film (cc·mm/$m^2$·day·atm) is measured at a temperature of 23° C. and a relative humidity of 60%.

(8) Melt Viscosity:

Using Toyo Seiki's Capillograph D-1, a sample is analyzed under the condition that the die is 1 mmφ×10 mm length, the apparent shear speed is 100/sec, the test temperature is 270° C., and the water content of the sample is at most 300 ppm.

(9) Determination of Dispersed Particle Size (Transmittance Electronic Microscopy):

Using an ultramicrotome (Boeckeler Instruments' CR-X Power Tome XL), an ultra-thin test sample having a thickness of about 0.1 μm is cut out of the body of a bottle (parison) vertically in the machine direction (MD) thereof. The polyamide is stained with ruthenium chloride vapor, and then the sample is observed on a copper mesh with an electronic microscope.

Condition in Observation:

Electronic microscope: Hitachi's surface-observing electronic microscope S4800
Accelerating voltage: 30 kV
Current: 10 mA
Power of microscope: 25,000
Observation mode: TEM From the shadowed density of the stained polyamide, the dispersed condition of polyamide is analyzed and the mean dispersed particle size thereof is determined.

(10) Intrinsic Viscosity of Polyester Resin:

0.5 g of polyester resin is accurately measured, and dissolved in 100 ml of a mixed solvent of phenol/1,1,2,2-tetrachloroethane (=6/4 by weight) with stirring at 120° C. to prepare a solution having a concentration of 0.5 g/dl. After cooled, the thick solution is diluted with the same solvent to prepare a ½ diluted solution (concentration, 0.25 g/dl) and a ⅕ diluted solution (concentration, 0.1 g/dl). Next, using an automatic viscometer (Shibayama Scientific Instruments' SS-600-L1), the dropping time of each solution at 25° C., tc, and the dropping time of the solvent, to, are measured. The ratio of the specific viscosity ηsp to the concentration C, ηsp/C is extrapolated relative to the concentration 0 (zero), thereby determining the intrinsic viscosity of the resin.

Specific viscosity ηsp=(tc/to)−1,
Intrinsic viscosity [η]=lim$_{c\to 0}$(ηsp/C).

Synthesis Example 1

15.00 kg of adipic acid, as accurately measured, was put into a jacketed polymerization tank equipped with a stirrer, a partial condenser, a condenser, a thermometer, a dropping funnel and a nitrogen gas-introducing duct, then fully purged with nitrogen, and heated in a small amount of a nitrogen flow, and at 170° C., adipic acid was dissolved to be a uniform flow state. With stirring, 13.91 kg of metaxylylenediamine was dropwise added to it, taking 160 minutes. During this, the inner temperature was continuously elevated up to 245° C., and water evaporating out simultaneously with the dropwise addition of metaxylylenediamine was removed out of the system via the partial condenser and the condenser. After the dropwise addition of metaxylylenediamine, the inner temperature was continuously elevated up to 255° C., and the reaction was continued for 15 minutes. Next, the inner pressure of the reaction system was continuously reduced to 600 mmHg, taking 10 minutes, and then the reaction was continued for 40 minutes. During this, the reaction temperature was continuously elevated up to 260° C. After the reaction, a pressure of 0.2 MPa was given to the polymerization tank with nitrogen gas, and the polymer (polymetaxylylenadipamide) was taken out through the nozzle at the bottom of the polymerization tank as strands, these were cooled with water and cut to give 25 kg of pellets. The relative viscosity of the obtained pellets was 2.13, and the moisture content thereof was 0.62%. This was fed into a tumbler (rotary vacuum tank) with a jacket heated with a heat carrier, at room temperature. The heat carrier was kept at 170° C. until polymetaxylylenadipamide crystallization at a pellet temperature rising over 120° C. Next, the heat carrier temperature was lowered to 225° C., and the temperature of the pellets in the tank was elevated up to 200° C. During this, when the pellet temperature rose over 140° C., the pressure inside the tank was reduced to be a reduced pressure state (0.5 to 10 Torr), and in that condition, this was kept heated at 200° C. for 20 minutes to attain solid-phase polymerization. Next, nitrogen was again introduced to keep normal pressure, and cooling the tank was started. When the pellet temperature reached 90° C. or lower, the pellets were taken out of the tank, thereby obtaining a polyamide 1 (hereinafter referred to as PA1). PA1 was analyzed, and as a result, the terminal amino group concentration was 21 μeq/g; the terminal carboxyl group concentration was 62 μeq/g; the relative viscosity was 2.64; and the moisture content was 0.03%.

Synthesis Examples 2 to 7

PA2 to PA7 having the properties shown in Table 1 were produced in the same manner as in Synthesis Example 1, for which, however, the amount of metaxylylenediamine used in the reaction, the reaction time and the temperature were changed. In Synthesis Example 2 (PA2) and Synthesis Example 7 (PA7), the melt polymerization polyamide was dried in a tumbler at 140° C. in place of processing it for solid-phase polymerization. Table 1 shows the relative viscosity of dried products.

[Table 1]

TABLE 1

| Polyamide | Melt Polymerization, Solid-Phase Polymerization | Relative Viscosity of Melt Polymerization Polymer | [NH$_2$] (μequivalent/g) | [COOH] (μequivalent/g) | Relative Viscosity of Dried Polymer or Solid-Phase Polymerization Polymer | Moisture content (wt. %) |
|---|---|---|---|---|---|---|
| PA1 | solid-phase polymerization | 2.13 | 21 | 62 | 2.64 | 0.03 |
| PA2 | melt polymerization | 2.08 | 39 | 84 | 2.12 | 0.04 |
| PA3 | solid-phase polymerization | 2.16 | 34 | 47 | 2.66 | 0.03 |
| PA4 | solid-phase polymerization | 2.07 | 64 | 17 | 2.65 | 0.03 |
| PA5 | solid-phase polymerization | 2.12 | 10 | 75 | 2.62 | 0.03 |
| PA6 | solid-phase polymerization | 2.20 | 24 | 28 | 3.82 | 0.02 |
| PA7 | melt polymerization | 1.80 | 37 | 132 | 1.83 | 0.04 |

Example 1

The following polyester resin, polyamide resin and polycarboxylic acid compound were mixed in a tumbler, and melt-kneaded in a twin-screw extruder (screw diameter: 20 mmφ, L/D: 25), at an extrusion temperature of 280° C. and an extrusion speed of 15 kg/hr, while the pressure in the extruder cylinder was reduced with a vacuum pump, and the extruded strands were pelletized into pellets.

Polyester resin: 79.8 parts by weight of dry pellets of polyethylene terephthalate resin (Invista's grade 1101E, intrinsic viscosity 0.80 dl/g), Polyamide resin: 20 parts by weight of PA1, Polycarboxylic acid compound: 0.2 parts by weight of trimellitic acid anhydride (hereinafter referred to as TMAn).

The obtained pellets were dried in vacuum at 150° C. for 6 hours, thereby giving a resin composition (preliminary master batch). 10 parts by weight of the preliminary master batch pellets and 90 parts by weight of polyethylene terephthalate resin (Invista's grade: 1101E) were dry-blended in a tumbler, and the mixture was injection-molded in an injection-molding device (Meiki Seisakusho's M200PDM-MJ) to give a parison having a length of 96 mm, a wall thickness of 4.0 mm, an outer diameter of 22.5 mm and a weight of 27 g. The injection molding condition was as follows: The resin temperature was 280° C., the mold temperature was 15° C., and the screw speed was 150 rpm.

The obtained parison was processed for biaxial-stretch blow molding, using a blow-molding device (Frontier's EFB1000ET), to give a biaxially-stretched blow bottle having a height of 223 mm, a body diameter of 65 mm, a capacity of 500 mL and a mean thickness of about 300 μm. The obtained bottle was colored little, and had good transparency and gas barrier properties. The results are shown in Table 2.

Example 2

A parison and a stretch blow bottle were produced under the same condition as in Example 1, for which, however, the ratio of the preliminary master batch to the polyethylene terephthalate resin was changed to 25/75 parts by weight. The obtained bottle was colored little, and had good transparency and gas barrier properties. The results are shown in Table 2.

Example 3

A parison and a stretch blow bottle were produced under the same condition as in Example 1, for which, however, the ratio of the preliminary master batch to the polyethylene terephthalate resin was changed to 35/65 parts by weight. The obtained bottle was colored little, and had good transparency and gas barrier properties. The results are shown in Table 2.

Comparative Example 1

A parison and a stretch blow bottle were produced under the same condition as in Example 1, for which, however, the polycarboxylic acid compound was not used. The results are shown in Table 4.

Example 4

A parison and a stretch blow bottle were produced under the same condition as in Example 1, for which, however, PA2 (dried product) was used as the polyamide resin, a preliminary master batch comprising polyamide resin(PA2)/polyethylene terephthalate/polycarboxylic acid compound=20/79.74/0.24 (by weight) was prepared, and the ratio of the preliminary master batch to the polyethylene terephthalate resin was changed to 25/75 parts by weight. The results are shown in Table 2.

Example 5

A parison and a stretch blow bottle were produced under the same condition as in Example 2, for which, however, a preliminary master batch comprising polyamide resin/polyethylene terephthalate/polycarboxylic acid compound=20/79.88/0.12 (by weight) was used. The results are shown in Table 3.

Example 6

A parison and a stretch blow bottle were produced under the same condition as in Example 2, for which, however, PA3 was used as the polyamide resin and a preliminary master batch comprising polyamide resin(PA3)/polyethylene terephthalate/polycarboxylic acid compound=20/79.6/0.4 (by weight) was used. The results are shown in Table 3.

Comparative Example 2

A parison and a stretch blow bottle were produced under the same condition as in Example 2, for which, however, PA4 was used as the polyamide resin. The results are shown in Table 4.

Comparative Example 3

A parison and a stretch blow bottle were produced under the same condition as in Example 6, for which, however, PA3 was used as the polyamide resin and a preliminary master batch comprising polyamide resin (PA3)/polyethylene terephthalate/polycarboxylic acid compound=20/78.8/1.2 (by weight) was used. The obtained bottle was colored and looked dark yellow, and its transparency was low. The results are shown in Table 4.

Comparative Example 4

A parison and a stretch blow bottle were produced under the same condition as in Example 2, for which, however, PA5 was used as the polyamide resin and a preliminary master batch comprising polyamide resin (PA5)/polyethylene terephthalate/polycarboxylic acid compound=20/79.72/0.28 (by weight) was used. The transparency of the obtained bottle was low. The results are shown in Table 4.

Comparative Example 5

A parison and a stretch blow bottle were produced under the same condition as in Example 2, for which, however, PA6 was used as the polyamide resin. The results are shown in Table 4.

Comparative Example 6

A parison and a stretch blow bottle were produced under the same condition as in Example 2, for which, however, PA7 (dried product) was used as the polyamide resin. The obtained bottle was colored and looked dark yellow, and its transparency was low. The results are shown in Table 5.

Comparative Example 7

A parison and a stretch blow bottle were produced under the same condition as in Example 1, for which, however, the ratio of the preliminary master batch to the polyethylene terephthalate resin was changed to 5/95 (by weight). The obtained bottle had poor gas barrier properties. The results are shown in Table 5.

Comparative Example 8

A parison and a stretch blow bottle were produced under the same condition as in Example 1, for which, however, a preliminary master batch comprising polyamide resin (PA1)/polyethylene terephthalate/polycarboxylic acid compound=20/79.82/0.18 (by weight) was prepared and the preliminary master batch was directly molded as it was. The obtained bottle was colored and looked dark yellow, and its transparency was low. The results are shown in Table 5.

Example 7

A parison and a stretch blow bottle were produced under the same condition as in Example 2, for which, however, trimellitic acid (hereinafter referred to as TMA) was used as the polycarboxylic acid compound. The results are shown in Table 3.

Example 8

A parison and a stretch blow bottle were produced under the same condition as in Example 2, for which, however, 1,2,4-cyclohexanetricarboxylic acid anhydride (hereinafter referred to as CHTAn) was used as the polycarboxylic acid compound. The results are shown in Table 3.

Comparative Example 9

A parison and a stretch blow bottle were produced under the same condition as in Example 2, for which, however, pyromellitic acid anhydride (hereinafter referred to as PMDA) was used as the polycarboxylic acid compound. The obtained bottle was colored and looked dark yellow. The results are shown in Table 5.

[Table 2]

TABLE 2

|  | Example | | | |
| --- | --- | --- | --- | --- |
|  | 1 | 2 | 3 | 4 |
| Polyester resin composition (wt. %) | | | | |
| polyamide resin | 2.00 | 5.00 | 7.00 | 5.00 |
| polyester resin | 97.98 | 94.95 | 92.93 | 94.94 |
| polycarboxylic acid compound | | | | |
| TMAn | 0.02 | 0.05 | 0.07 | 0.06 |
| TMA | — | — | — | — |
| CHTAn | — | — | — | — |
| PMDA | — | — | — | — |
| Polyamide resin | PA1 | PA1 | PA1 | PA2 |
| terminal amino group concentration a (μeq/g) | 21 | 21 | 21 | 39 |
| terminal carboxyl group concentration b (μeq/g) | 62 | 62 | 62 | 84 |
| formula (2) a + b (μeq/g) | 83 | 83 | 83 | 123 |
| Polycarboxylic acid compound | | | | |
| carboxyl group concentration c (μeq/g) | 10400 | 10400 | 10400 | 10400 |
| formula (3) c × Cc (μeq/g) | 2.0 | 5.2 | 7.2 | 6.2 |
| formula (4) (c × Cc)/(a × Ca) (μeq/g) | 4.9 | 4.9 | 4.9 | 3.2 |
| Relative viscosity of polyamide resin | 2.64 | 2.64 | 2.64 | 2.12 |
| Melt viscosity ratio (polyamide resin/polyester resin) | 1.0 | 1.0 | 1.0 | 0.7 |
| Test results | | | | |
| polyamide mean dispersed particle size in parison body (μm) | 0.19 | 0.18 | 0.20 | 0.20 |
| haze of bottle body (%) | 3.2 | 5.5 | 6.2 | 5.7 |
| YI of bottle body | 6.2 | 8.7 | 10.8 | 8.9 |
| oxygen transmission rate of bottle (cc/bottle · day · 0.21 atm) | 0.030 | 0.020 | 0.017 | 0.020 |

[Table 3]

TABLE 3

|  | Example | | | |
| --- | --- | --- | --- | --- |
|  | 5 | 6 | 7 | 8 |
| Polyester resin composition (wt. %) | | | | |
| polyamide resin | 5.00 | 5.00 | 5.00 | 5.00 |
| polyester resin | 94.97 | 94.90 | 94.95 | 94.95 |
| polycarboxylic acid compound | | | | |
| TMAn | 0.03 | 0.10 | — | — |
| TMA | — | — | 0.05 | — |
| CHTAn | — | — | — | 0.05 |
| PMDA | — | — | — | — |
| Polyamide resin | PA1 | PA3 | PA1 | PA1 |
| terminal amino group concentration a (μeq/g) | 21 | 34 | 21 | 21 |
| terminal carboxyl group concentration b (μeq/g) | 62 | 47 | 62 | 62 |
| formula (2) a + b (μeq/g) | 83 | 81 | 83 | 83 |
| Polycarboxylic acid compound | | | | |
| carboxyl group concentration c (μeq/g) | 10400 | 10400 | 14300 | 10100 |
| formula (3) c × Cc (μeq/g) | 3.2 | 10.4 | 7.1 | 5.1 |
| formula (4) (c × Cc)/(a × Ca) (μeq/g) | 3.1 | 6.0 | 6.8 | 4.8 |
| Relative viscosity of polyamide resin | 2.64 | 2.66 | 2.64 | 2.64 |
| Melt viscosity ratio (polyamide resin/polyester resin) | 1.0 | 1.0 | 1.0 | 1.0 |
| Test results | | | | |
| polyamide mean dispersed particle size in parison body (μm) | 0.21 | 0.22 | 0.21 | 0.34 |
| haze of bottle body (%) | 5.7 | 7.2 | 5.8 | 7.5 |
| YI of bottle body | 9.3 | 9.8 | 9.0 | 9.8 |
| oxygen transmission rate of bottle (cc/bottle · day · 0.21 atm) | 0.021 | 0.020 | 0.020 | 0.020 |

[Table 4]

TABLE 4

|  | Comparative Example | | | | |
| --- | --- | --- | --- | --- | --- |
|  | 1 | 2 | 3 | 4 | 5 |
| Polyester resin composition (wt. %) | | | | | |
| polyamide resin | 5.00 | 5.00 | 5.00 | 5.00 | 5.00 |
| polyester resin | 95.00 | 94.95 | 94.70 | 94.93 | 94.95 |
| polycarboxylic acid compound | | | | | |
| TMAn | — | 0.05 | 0.30 | 0.07 | 0.05 |
| TMA | — | — | — | — | — |
| CHTAn | — | — | — | — | — |
| PMDA | — | — | — | — | — |
| Polyamide resin | PA1 | PA4 | PA3 | PA5 | PA6 |
| terminal amino group concentration a (µeq/g) | 21 | 64 | 34 | 10 | 24 |
| terminal carboxyl group concentration b (µeq/g) | 62 | 17 | 47 | 75 | 28 |
| formula (2) a + b (µeq/g) | 83 | 81 | 81 | 85 | 52 |
| Polycarboxylic acid compound | | | | | |
| carboxyl group concentration c (µeq/g) | — | 10400 | 10400 | 10400 | 10400 |
| formula (3) c × Cc (µeq/g) | — | 5.2 | 31.2 | 7.3 | 5.2 |
| formula (4) (c × Cc)/(a × Ca) (µeq/g) | — | 1.6 | 9.8 | 14.6 | 4.3 |
| Relative viscosity of polyamide resin | 2.64 | 2.65 | 2.66 | 2.62 | 3.82 |
| Melt viscosity ratio (polyamide resin/polyester resin) | 1.0 | 1.0 | 1.0 | 0.9 | 3.3 |
| Test results | | | | | |
| polyamide mean dispersed particle size in parison body (µm) | 0.44 | 0.24 | 0.44 | 0.39 | 0.36 |
| haze of bottle body (%) | 16.3 | 7.7 | 14.0 | 14.2 | 16.5 |
| YI of bottle body | 13.2 | 16.9 | 13.3 | 11.4 | 12.9 |
| oxygen transmission rate of bottle (cc/bottle · day · 0.21 atm) | 0.020 | 0.021 | 0.020 | 0.021 | 0.022 |

[Table 5]

TABLE 5

|  | Comparative Example | | | |
| --- | --- | --- | --- | --- |
|  | 6 | 7 | 8 | 9 |
| Polyester resin composition (wt. %) | | | | |
| polyamide resin | 5.00 | 1.00 | 20.00 | 5.00 |
| polyester resin | 94.95 | 98.99 | 79.82 | 94.95 |
| polycarboxylic acid compound | | | | |
| TMAn | 0.05 | 0.01 | 0.18 | — |
| TMA | — | — | — | — |
| CHTAn | — | — | — | — |
| PMDA | — | — | — | 0.05 |
| Polyamide resin | PA7 | PA1 | PA1 | PA1 |
| terminal amino group concentration a (µeq/g) | 37 | 21 | 21 | 21 |
| terminal carboxyl group concentration b (µeq/g) | 132 | 62 | 62 | 62 |
| formula (2) a + b (µeq/g) | 169 | 83 | 83 | 83 |
| Polycarboxylic acid compound | | | | |
| carboxyl group concentration c (µeq/g) | 10400 | 10400 | 10400 | 9200 |
| formula (3) c × Cc (µeq/g) | 5.2 | 1.0 | 18.8 | 4.6 |
| formula (4) (c × Cc)/(a × Ca) (µeq/g) | 2.8 | 4.9 | 4.5 | 4.4 |
| Relative viscosity of polyamide resin | 1.83 | 2.64 | 2.64 | 2.64 |
| Melt viscosity ratio (polyamide resin/polyester resin) | 0.1 | 1.0 | 1.0 | 1.0 |
| Test results | | | | |
| polyamide mean dispersed particle size in parison body (µm) | 0.42 | 0.19 | 0.25 | 0.22 |
| haze of bottle body (%) | 15.3 | 2.5 | 19.4 | 8.2 |
| YI of bottle body | 14.2 | 4.8 | 22.7 | 14.7 |
| oxygen transmission rate of bottle (cc/bottle · day · 0.21 atm) | 0.023 | 0.038 | 0.008 | 0.022 |

Example 9

The following polyester resin, polyamide resin and polycarboxylic acid compound were mixed in a tumbler, and melt-kneaded in a twin-screw extruder (screw diameter: 20 mmφ, L/D: 25), at an extrusion temperature of 280° C. and an extrusion speed of 15 kg/hr, while the pressure in the extruder cylinder was reduced with a vacuum pump, and the extruded strands were pelletized into pellets.

Polyester resin: 79.8 parts by weight of dry pellets of polyethylene terephthalate resin (Invista's grade 1101E, intrinsic viscosity 0.80 dl/g), Polyamide resin: 20 parts by weight of PA1,
Polycarboxylic acid compound: 0.2 parts by weight of phthalic anhydride (hereinafter referred to as PAn).

The obtained pellets were dried in vacuum at 150° C. for 6 hours, thereby giving a resin composition (preliminary master batch). 10 parts by weight of the preliminary master batch pellets and 90 parts by weight of polyethylene terephthalate resin (Invista's grade: 1101E) were dry-blended in a tumbler, and the mixture was injection-molded in an injection-molding device (Meiki Seisakusho's M200PDM-MJ) to give a parison having a length of 96 mm, a wall thickness of 4.0 mm, an outer diameter of 22.5 mm and a weight of 27 g. The injection molding condition was as follows: The resin temperature was 280° C., the mold temperature was 15° C., and the screw speed was 150 rpm.

The obtained parison was processed for biaxial-stretch blow molding, using a blow-molding device (Frontier's EFB1000ET), to give a biaxially-stretched blow bottle having a height of 223 mm, a body diameter of 65 mm, a capacity of 500 mL and a mean thickness of about 300 μm. The obtained bottle was colored little, and had good transparency and gas barrier properties. The results are shown in Table 6.

Example 10

A parison and a stretch blow bottle were produced under the same condition as in Example 9, for which, however, the ratio of the preliminary master batch to the polyethylene terephthalate resin was changed to 25/75 parts by weight. The obtained bottle was colored little, and had good transparency and gas barrier properties. The results are shown in Table 6.

Example 11

A parison and a stretch blow bottle were produced under the same condition as in Example 9, for which, however, the ratio of the preliminary master batch to the polyethylene terephthalate resin was changed to 35/65 parts by weight. The obtained bottle was colored little, and had good transparency and gas barrier properties. The results are shown in Table 6.

Comparative Example 10

A parison and a stretch blow bottle were produced under the same condition as in Example 9, for which, however, the polycarboxylic acid compound was not used. The results are shown in Table 8.

Example 12

A parison and a stretch blow bottle were produced under the same condition as in Example 9, for which, however, PA2 (dried product) was used as the polyamide resin, a preliminary master batch comprising polyamide resin(PA2)/polyethylene terephthalate/polycarboxylic acid compound (PAn)=20/79.74/0.24 (by weight) was prepared, and the ratio of the preliminary master batch to the polyethylene terephthalate resin was changed to 25/75 parts by weight. The results are shown in Table 6.

Example 13

A parison and a stretch blow bottle were produced under the same condition as in Example 10, for which, however, PA3 was used as the polyamide resin and a preliminary master batch comprising polyamide resin(PA3)/polyethylene terephthalate/polycarboxylic acid compound (PAn)=20/79.6/0.4 (by weight) was used. The results are shown in Table 7.

Comparative Example 11

A parison and a stretch blow bottle were produced under the same condition as in Example 10, for which, however, PA4 was used as the polyamide resin (A). The obtained bottle was colored and looked dark yellow. The results are shown in Table 8.

Comparative Example 12

A parison and a stretch blow bottle were produced under the same condition as in Example 10, for which, however, PA3 was used as the polyamide resin and a preliminary master batch comprising polyamide resin (PA3)/polyethylene terephthalate/polycarboxylic acid compound (PAn)=20/78.6/1.4 (by weight) was used. The obtained bottle was colored and looked dark yellow, and its transparency was low. The results are shown in Table 8.

Comparative Example 13

A parison and a stretch blow bottle were produced under the same condition as in Example 10, for which, however, PA5 was used as the polyamide resin and a preliminary master batch comprising polyamide resin (PA5)/polyethylene terephthalate/polycarboxylic acid compound (PAn)=20/79.6/0.4 (by weight) was used. The transparency of the obtained bottle was low. The results are shown in Table 8.

Comparative Example 14

A parison and a stretch blow bottle were produced under the same condition as in Example 10, for which, however, PA6 was used as the polyamide resin. The transparency of the obtained bottle was low. The results are shown in Table 8.

Comparative Example 15

A parison and a stretch blow bottle were produced under the same condition as in Example 10, for which, however, PA7 (dried product) was used as the polyamide resin (A). The obtained bottle was colored and looked dark yellow, and its transparency was low. The results are shown in Table 9.

Comparative Example 16

A parison and a stretch blow bottle were produced under the same condition as in Example 9, for which, however, the ratio of the preliminary master batch to the polyethylene terephthalate resin was changed to 5/95 (by weight). The obtained bottle had poor gas barrier properties. The results are shown in Table 9.

Comparative Example 17

A parison and a stretch blow bottle were produced under the same condition as in Example 9, for which, however, a preliminary master batch comprising polyamide resin (PA1)/polyethylene terephthalate/polycarboxylic acid compound (PAn)=35/64.65/0.35 (by weight) was prepared and the preliminary master batch was directly molded as it was. The obtained bottle was colored and looked dark yellow, and its transparency was low. The results are shown in Table 9.

Example 14

A parison and a stretch blow bottle were produced under the same condition as in Example 10, for which, however, PAn and trimellitic acid anhydride (hereinafter referred to as TMAn) were used as the polycarboxylic acid compound, and a preliminary master batch comprising polyamide resin (PA1)/polyethylene terephthalate/PAn/TMAn=20/79.76/0.12/0.12 (by weight) was used. The results are shown in Table 7.

Example 15

A parison and a stretch blow bottle were produced under the same condition as in Example 10, for which, however, the composition of the preliminary master batch was changed to polyamide resin (PA1)/polyethylene terephthalate/PAn/TMAn=20/79.80/0.16/0.04 (by weight) The results are shown in Table 7.

Comparative Example 18

A parison and a stretch blow bottle were produced under the same condition as in Example 10, for which, however, pyromellitic acid anhydride (hereinafter referred to as PMDA) was used as the polycarboxylic acid compound. The obtained bottle was colored and looked dark yellow. The results are shown in Table 9.

[Table 6]

TABLE 6

|  | Example 9 | Example 10 | Example 11 | Example 12 |
|---|---|---|---|---|
| Polyester resin composition (wt. %) | | | | |
| polyamide resin | 2.00 | 5.00 | 7.00 | 5.00 |
| polyester resin | 97.98 | 94.95 | 92.93 | 94.94 |
| polycarboxylic acid compound | | | | |
| PAn | 0.02 | 0.05 | 0.07 | 0.06 |
| TMAn | — | — | — | — |
| PMDA | — | — | — | — |
| Polyamide resin | PA1 | PA1 | PA1 | PA2 |
| terminal amino group concentration a ($\mu$eq/g) | 21 | 21 | 21 | 39 |
| terminal carboxyl group concentration b ($\mu$eq/g) | 62 | 62 | 62 | 84 |
| formula (2) a + b ($\mu$eq/g) | 83 | 83 | 83 | 123 |
| Polycarboxylic acid compound | | | | |
| carboxyl group concentration c ($\mu$eq/g) | 6760 | 6760 | 6760 | 6760 |
| formula (3) c × Cc ($\mu$eq/g) | 1.4 | 3.4 | 4.7 | 4.1 |
| formula (4) (c × Cc)/(a × Ca) ($\mu$eq/g) | 3.2 | 3.2 | 3.2 | 2.1 |
| Relative viscosity of polyamide resin | 2.64 | 2.64 | 2.64 | 2.12 |
| Melt viscosity ratio (polyamide resin/polyester resin) | 1.0 | 1.0 | 1.0 | 0.7 |
| Test results | | | | |
| polyamide mean dispersed particle size in parison body ($\mu$m) | 0.21 | 0.20 | 0.21 | 0.19 |
| haze of bottle body (%) | 3.6 | 6.0 | 6.6 | 6.2 |
| YI of bottle body | 5.1 | 7.4 | 9.8 | 8.1 |
| oxygen transmission rate of bottle (cc/bottle · day · 0.21 atm) | 0.031 | 0.022 | 0.017 | 0.020 |

[Table 7]

TABLE 7

|  | Example 13 | Example 14 | Example 15 |
|---|---|---|---|
| Polyester resin composition (wt. %) | | | |
| polyamide resin | 5.00 | 5.00 | 5.00 |
| polyester resin | 94.90 | 94.94 | 94.95 |
| Polycarboxylic acid compound | | | |
| Pan | 0.10 | 0.03 | 0.04 |
| TMAn | — | 0.03 | 0.01 |
| PMDA | — | — | — |
| Polyamide resin | PA3 | PA1 | PA1 |
| terminal amino group concentration a ($\mu$eq/g) | 34 | 21 | 21 |
| terminal carboxyl group concentration b ($\mu$eq/g) | 47 | 62 | 62 |
| formula (2) a + b ($\mu$eq/g) | 81 | 83 | 83 |
| Polycarboxylic acid compound | | | |
| carboxyl group concentration c ($\mu$eq/g) | 6760 | 8580 | 7490 |
| formula (3) c × Cc ($\mu$eq/g) | 6.8 | 5.2 | 3.7 |
| formula (4) (c × Cc)/(a × Ca) ($\mu$eq/g) | 4.0 | 4.9 | 3.6 |
| Relative viscosity of polyamide resin | 2.66 | 2.64 | 2.64 |
| Melt viscosity ratio (polyamide resin/polyester resin) | 1.0 | 1.0 | 1.0 |
| Test results | | | |
| polyamide mean dispersed particle size in parison body ($\mu$m) | 0.21 | 0.19 | 0.21 |
| haze of bottle body (%) | 7.7 | 5.7 | 5.8 |
| YI of bottle body | 9.0 | 8.1 | 7.7 |
| oxygen transmission rate of bottle (cc/bottle · day · 0.21 atm) | 0.020 | 0.020 | 0.020 |

[Table 8]

TABLE 8

| | Comparative Example | | | | |
|---|---|---|---|---|---|
| | 10 | 11 | 12 | 13 | 14 |
| Polyester resin composition (wt. %) | | | | | |
| polyamide resin | 5.00 | 5.00 | 5.00 | 5.00 | 5.00 |
| polyester resin | 95.00 | 94.95 | 94.65 | 94.90 | 94.95 |
| polycarboxylic acid compound | | | | | |
| PAn | — | 0.05 | 0.35 | 0.10 | 0.05 |
| TMAn | — | — | — | — | — |
| PMDA | — | — | — | — | — |
| Polyamide resin | PA1 | PA4 | PA3 | PA5 | PA6 |
| terminal amino group concentration a (μeq/g) | 21 | 64 | 34 | 10 | 24 |
| terminal carboxyl group concentration b (μeq/g) | 62 | 17 | 47 | 75 | 28 |
| formula (2) a + b (μeq/g) | 83 | 81 | 81 | 85 | 52 |
| Polycarboxylic acid compound | | | | | |
| carboxyl group concentration c (μeq/g) | — | 6760 | 6760 | 6760 | 6760 |
| formula (3) c × Cc (μeq/g) | — | 3.4 | 23.6 | 6.8 | 3.4 |
| formula (4) (c × Cc)/(a × Ca) (μeq/g) | — | 1.1 | 13.9 | 13.5 | 2.8 |
| Relative viscosity of polyamide resin | 2.64 | 2.65 | 2.66 | 2.62 | 3.82 |
| Melt viscosity ratio (polyamide resin/polyester resin) | 1.0 | 1.0 | 1.0 | 0.9 | 3.3 |
| Test results | | | | | |
| polyamide mean dispersed particle size in parison body (μm) | 0.44 | 0.26 | 0.42 | 0.36 | 0.39 |
| haze of bottle body (%) | 16.3 | 8.4 | 14.2 | 13.3 | 16.2 |
| YI of bottle body | 13.2 | 14.7 | 12.3 | 10.5 | 11.9 |
| oxygen transmission rate of bottle (cc/bottle · day · 0.21 atm) | 0.020 | 0.020 | 0.021 | 0.020 | 0.021 |

[Table 9]

TABLE 9

| | Comparative Example | | | |
|---|---|---|---|---|
| | 15 | 16 | 17 | 18 |
| Polyester resin composition (wt. %) | | | | |
| polyamide resin | 5.00 | 1.00 | 35.00 | 5.00 |
| polyester resin | 94.95 | 98.99 | 64.65 | 94.95 |
| polycarboxylic acid compound | | | | |
| PAn | 0.05 | 0.01 | 0.35 | — |
| TMAn | — | — | — | — |
| PMDA | — | — | — | 0.05 |
| Polyamide resin | PA7 | PA1 | PA1 | PA1 |
| terminal amino group concentration a (μeq/g) | 37 | 21 | 21 | 21 |
| terminal carboxyl group concentration b (μeq/g) | 132 | 62 | 62 | 62 |
| formula (2) a + b (μeq/g) | 169 | 83 | 83 | 83 |
| Polycarboxylic acid compound | | | | |
| carboxyl group concentration c (μeq/g) | 6760 | 6760 | 6760 | 9200 |
| formula (3) c × Cc (μeq/g) | 3.4 | 0.7 | 23.6 | 4.6 |
| formula (4) (c × Cc)/(a × Ca) (μeq/g) | 1.8 | 3.2 | 3.2 | 4.4 |
| Relative viscosity of polyamide resin | 1.83 | 2.64 | 2.64 | 2.64 |
| Melt viscosity ratio (polyamide resin/polyester resin) | 0.1 | 1.0 | 1.0 | 1.0 |
| Test results | | | | |
| polyamide mean dispersed particle size in parison body (μm) | 0.40 | 0.22 | 0.26 | 0.22 |
| haze of bottle body (%) | 14.7 | 3.0 | 22.4 | 8.2 |
| YI of bottle body | 13.3 | 4.5 | 18.9 | 14.7 |
| oxygen transmission rate of bottle (cc/bottle · day · 0.21 atm) | 0.021 | 0.040 | 0.007 | 0.022 |

Example 16

The preliminary master batch obtained in Example 9 was melt-kneaded and formed into a film according to a T-die method, in which the cylinder temperature was from 270 to 290° C., the T-die temperature was 280° C., the screw speed was 100 rpm, the cooling roll temperature was 70° C., thereby producing an unstretched sheet having a width of 120 mm and a thickness of about 0.3 mm. Next, using a tenter-type biaxial stretcher by Toyo Seiki, the unstretched sheet was preheated at 90 to 110° C. for 30 seconds and then biaxially-stretched in the machine direction and in the cross direction both at a draw ratio of 3.5 times, at a linear stretching speed of 60%/sec, thereby giving a stretched film having a thickness of 20 μm.

Thus obtained, the unstretched sheet had a haze of 3.5% and YI of 2.2, and the stretched film had a haze of 3.8% and YI of 2.8 and its oxygen transmission coefficient was 0.26 cc·mm/m²·day/atm (23° C., 60% RH).

Comparative Example 19

The preliminary master batch (PA1/polyethylene terephthalate=20/80, by weight) obtained in Comparative Example 10 was melt-kneaded and formed into a film according to a T-die method, in which the cylinder temperature was from 270 to 290° C., the T-die temperature was 280° C., the screw speed was 100 rpm, the cooling roll temperature was 70° C., thereby producing an unstretched sheet having a width of 120 mm and a thickness of about 0.3 mm. Next, using a tenter-type biaxial stretcher by Toyo Seiki, the unstretched sheet was preheated at 90 to 110° C. for 30 seconds and then biaxially-stretched in the machine direction and in the cross direction both at a draw ratio of 3.5 times, at a linear stretching speed of 60%/sec, thereby giving a stretched film having a thickness of 20 μm. Thus obtained, the unstretched sheet had a haze of 12.5% and YI of 5.6, and the stretched film had a haze of 13.9% and YI of 5.9 and its oxygen transmission coefficient was 0.28 cc·mm/m²·day/atm (23° C., 60% RH).

Example 17

The process of Example 1 was repeated to produce a biaxially-stretched blow bottle. The results are shown in Table 10.

Example 18

A parison and a stretch blow bottle were produced under the same condition as in Example 1, for which, however, the ratio of the preliminary master batch prepared in Example 17 to polyethylene terephthalate resin was changed to 25/75 parts by weight. The obtained bottle was colored little, and had good transparency and gas barrier properties. The results are shown in Table 10.

Example 19

A parison and a stretch blow bottle were produced under the same condition as in Example 1, for which, however, the ratio of the preliminary master batch prepared in Example 17 to polyethylene terephthalate resin was changed to 35/65 parts by weight. The obtained bottle was colored little, and had good transparency and gas barrier properties. The results are shown in Table 10.

Example 20

A parison and a stretch blow bottle were produced under the same condition as in Example 17, for which, however, a preliminary master batch comprising 99% by weight of PA1 and 1.0% by weight of a polycarboxylic acid compound (C), TMAn was prepared and the ratio of the preliminary master batch to the polyethylene terephthalate resin was changed to 5/95% by weight. The obtained bottle was colored little, and had good transparency and gas barrier properties. The results are shown in Table 10.

Example 21

A parison and a stretch blow bottle were produced under the same condition as in Example 17, for which, however, a preliminary master batch comprising polyamide resin(PA1)/polyethylene terephthalate/polycarboxylic acid compound=35/64.65/0.35% by weight was prepared, and the ratio of the preliminary master batch to the polyethylene terephthalate resin was changed to 14.29/85.71% by weight. The obtained bottle was colored little, and had good transparency and gas barrier properties. The results are shown in Table 10.

Comparative Example 20

A parison and a stretch blow bottle were produced under the same condition as in Example 17, for which, however, a polycarboxylic acid compound was not used. The results are shown in Table 12.

Reference Example 1

A parison and a stretch blow bottle were produced under the same condition as in Example 17, for which, however, a preliminary master batch comprising polyamide resin (PA1)/polyethylene terephthalate=20/80% by weight was prepared and the ratio of preliminary master batch/polyethylene terephthalate resin/polycarboxylic acid (TMAn) was 25/74.95/0.05% by weight. The results are shown in Table 12.

Reference Example 2

A parison and a stretch blow bottle were produced under the same condition as in Example 17, for which, however, a master batch process was not used, and a resin composition prepared by dry-blending the ingredients in a composition ratio of polyamide resin (PA1)/polyethylene terephthalate/polycarboxylic acid (TMAn)=5/94.95/0.05% by weight and melting them all at a time was used. The results are shown in Table 12.

Reference Example 3

A parison and a stretch blow bottle were produced under the same condition as in Example 17, for which, however, a preliminary master batch comprising polyethylene terephthalate/polycarboxylic acid compound (TMAn)=99.75/0.25% by weight was prepared and the ratio of preliminary master batch/polyamide resin (PA1)/polyethylene terephthalate was 20/5/75% by weight. The results are shown in Table 12.

Example 22

A parison and a stretch blow bottle were produced under the same condition as in Example 17, for which, however, PA2 (dried product) was used as the polyamide resin (A), a preliminary master batch comprising polyamide resin (PA2)/polyethylene terephthalate/polycarboxylic acid compound=20/79.74/0.24% by weight was prepared, and the ratio of preliminary master batch to the polyethylene terephthalate resin was 25/75% by weight. The results are shown in Table 11.

Example 23

A parison and a stretch blow bottle were produced under the same condition as in Example 18, for which, however, a preliminary master batch comprising polyamide resin/polyethylene terephthalate/polycarboxylic acid compound=20/79.88/0.12% by weight was used. The results are shown in Table 11.

Example 24

A parison and a stretch blow bottle were produced under the same condition as in Example 18, for which, however, PA3 was used as the polyamide resin, and a preliminary master batch comprising polyamide resin (PA3)/polyethylene terephthalate/polycarboxylic acid compound=20/79.6/0.4 (by weight) was used. The results are shown in Table 11.

Comparative Example 21

A parison and a stretch blow bottle were produced under the same condition as in Example 18, for which, however, PA4 was used as the polyamide resin. The obtained bottle was colored and looked dark yellow. The results are shown in Table 12.

Comparative Example 22

A parison and a stretch blow bottle were produced under the same condition as in Example 18, for which, however, PA6 was used as the polyamide resin. The results are shown in Table 12.

Comparative Example 23

A parison and a stretch blow bottle were produced under the same condition as in Example 18, for which, however, PA7 (dried product) was used as the polyamide resin. The obtained bottle was colored and looked dark yellow, and its transparency was low. The results are shown in Table 13.

Reference Example 4

A parison and a stretch blow bottle were produced under the same condition as in Example 17, for which, however, the ratio of the preliminary master batch to the polyethylene terephthalate resin was changed to 5/95 (by weight). The obtained bottle had poor gas barrier properties. The results are shown in Table 13.

Comparative Example 24

A parison and a stretch blow bottle were produced under the same condition as in Example 17, for which, however, a preliminary master batch comprising polyamide resin (PA1)/polyethylene terephthalate/polycarboxylic acid compound=35/64.65/0.35% by weight was prepared and the preliminary master batch was directly molded as it was. The obtained bottle was colored and looked dark yellow, and its transparency was low. The results are shown in Table 13.

Example 25

A parison and a stretch blow bottle were produced under the same condition as in Example 18, for which, however, trimellitic acid (hereinafter referred to as TMA) was used as the polycarboxylic acid compound. The results are shown in Table 11.

Example 26

A parison and a stretch blow bottle were produced under the same condition as in Example 18, for which, however, phthalic anhydride (hereinafter referred to as PAn) was used as the polycarboxylic acid compound (C). The results are shown in Table 11.

Reference Example 5

A parison and a stretch blow bottle were produced under the same condition as in Example 18, for which, however, pyromellitic acid anhydride (hereinafter referred to as PMDA) was used as the polycarboxylic acid compound. The obtained bottle was colored and looked dark yellow. The results are shown in Table 13.

Reference Example 6

A parison and a stretch blow bottle were produced under the same condition as in Example 17, for which, however, a preliminary master batch comprising polyamide resin (PA1)/polyethylene terephthalate/polycarboxylic acid compound=50/49.5/0.5% by weight was prepared, and the ratio of the preliminary master batch to the polyethylene terephthalate resin was changed to 10/90% by weight. The obtained bottle has poor transparency. The results are shown in Table 13.

Reference Example 7

A parison and a stretch blow bottle were produced under the same condition as in Example 17, for which, however, a preliminary master batch comprising polyamide resin (PA1)/polyethylene terephthalate/polycarboxylic acid compound=80/19.2/0.8% by weight was prepared, and the ratio of the preliminary master batch to the polyethylene terephthalate resin was changed to 6.25/93.75% by weight. The obtained bottle has poor transparency. The results are shown in Table 13.

TABLE 10

|  | Example | | | | |
| --- | --- | --- | --- | --- | --- |
|  | 17 | 18 | 19 | 20 | 21 |
| Polyester resin composition (wt. %) | | | | | |
| polyamide resin | 2.00 | 5.00 | 7.00 | 4.95 | 5.00 |
| polyester resin | 97.98 | 94.95 | 92.93 | 95.00 | 94.95 |
| polycarboxylic acid compound | | | | | |
| TMAn | 0.02 | 0.05 | 0.07 | 0.05 | 0.05 |
| TMA | — | — | — | — | — |
| PAn | — | — | — | — | — |
| PMDA | — | — | — | — | — |
| Production method for polyester resin composition | MB* | MB | MB | MB | MB |

TABLE 10-continued

|  | Example | | | | |
| --- | --- | --- | --- | --- | --- |
|  | 17 | 18 | 19 | 20 | 21 |
| Master batch composition (wt. %) | | | | | |
| polyamide resin | 20.00 | 20.00 | 20.00 | 99.00 | 35.00 |
| polyester resin | 79.80 | 79.80 | 79.80 | — | 64.65 |
| polycarboxylic acid compound | 0.20 | 0.20 | 0.20 | 1.00 | 0.35 |
| Polyamide resin | PA1 | PA1 | PA1 | PA1 | PA1 |
| terminal amino group concentration a (μeq/g) | 21 | 21 | 21 | 21 | 21 |
| terminal carboxyl group concentration b (μeq/g) | 62 | 62 | 62 | 62 | 62 |
| formula (2) a + b (μeq/g) | 83 | 83 | 83 | 83 | 83 |
| Relative viscosity of polyamide resin | 2.64 | 2.64 | 2.64 | 2.64 | 2.64 |
| Intrinsic viscosity of polyester resin | 0.80 | 0.80 | 0.80 | 0.80 | 0.80 |
| Melt viscosity ratio (polyamide resin/polyester resin) | 1.0 | 1.0 | 1.0 | 1.0 | 1.0 |
| Test results | | | | | |
| polyamide mean dispersed particle size in parison body (μm) | 0.19 | 0.18 | 0.20 | 0.20 | 0.21 |
| haze of bottle body (%) | 3.2 | 5.5 | 6.2 | 6.3 | 6.5 |
| YI of bottle body | 6.2 | 8.7 | 10.8 | 9.2 | 9.5 |
| oxygen transmission rate of bottle (cc/bottle · day · 0.21 atm) | 0.030 | 0.020 | 0.017 | 0.021 | 0.020 |

MB*: master batch system.

TABLE 11

|  | Example | | | | |
| --- | --- | --- | --- | --- | --- |
|  | 22 | 23 | 24 | 25 | 26 |
| Polyester resin composition (wt. %) | | | | | |
| polyamide resin | 5.00 | 5.00 | 5.00 | 5.00 | 5.00 |
| polyester resin | 94.94 | 94.97 | 94.90 | 94.95 | 94.95 |
| polycarboxylic acid compound | | | | | |
| TMAn | 0.06 | 0.03 | 0.10 | — | — |
| TMA | — | — | — | 0.05 | — |
| PAn | — | — | — | — | 0.05 |
| PMDA | — | — | — | — | — |
| Production method for polyester resin composition | MB* | MB | MB | MB | MB |
| Master batch composition (wt. %) | | | | | |
| polyamide resin | 20.00 | 20.00 | 20.00 | 20.00 | 20.00 |
| polyester resin | 79.76 | 79.88 | 79.60 | 79.80 | 79.80 |
| polycarboxylic acid compound | 0.24 | 0.12 | 0.40 | 0.20 | 0.20 |
| Polyamide resin | PA2 | PA1 | PA3 | PA1 | PA1 |
| terminal amino group concentration a (μeq/g) | 39 | 21 | 34 | 21 | 21 |
| terminal carboxyl group concentration b (μeq/g) | 84 | 62 | 47 | 62 | 62 |
| formula (2) a + b (μeq/g) | 123 | 83 | 81 | 83 | 83 |
| Relative viscosity of polyamide resin | 2.12 | 2.64 | 2.66 | 2.64 | 2.64 |
| Intrinsic viscosity of polyester resin | 0.80 | 0.80 | 0.80 | 0.80 | 0.80 |
| Melt viscosity ratio (polyamide resin/polyester resin) | 0.7 | 1.0 | 1.0 | 1.0 | 1.0 |
| Test results | | | | | |
| polyamide mean dispersed particle size in parison body (μm) | 0.20 | 0.21 | 0.22 | 0.21 | 0.20 |
| haze of bottle body (%) | 5.7 | 5.7 | 7.2 | 5.8 | 6.0 |
| YI of bottle body | 8.9 | 9.3 | 9.8 | 9.0 | 7.4 |
| oxygen transmission rate of bottle (cc/bottle · day · 0.21 atm) | 0.020 | 0.021 | 0.020 | 0.020 | 0.022 |

MB*: master batch system.

TABLE 12

|  | Comparative Example 20 | Reference Example | |
| --- | --- | --- | --- |
|  |  | 1 | 2 |
| Polyester resin composition (wt. %) | | | |
| polyamide resin | 5.00 | 5.00 | 5.00 |
| polyester resin | 95.00 | 94.95 | 94.95 |
| polycarboxylic acid compound | | | |
| TMAn | — | 0.05 | 0.05 |
| TMA | — | — | — |

TABLE 12-continued

|  |  |  |  |
|---|---|---|---|
| PAn | — | — | — |
| PMDA | — | — | — |
| Production method for polyester resin composition | MB* | MB | DB* |
| Master batch composition (wt. %) |  |  |  |
| polyamide resin | 20.00 | 20.00 | — |
| polyester resin | 80.00 | 80.00 | — |
| polycarboxylic acid compound | — | — | — |
| Polyamide resin | PA1 | PA1 | PA1 |
| terminal amino group concentration a (μeq/g) | 21 | 21 | 21 |
| terminal carboxyl group concentration b (μeq/g) | 62 | 62 | 62 |
| formula (2) a + b (μeq/g) | 83 | 83 | 83 |
| Relative viscosity of polyamide resin | 2.64 | 2.64 | 2.64 |
| Intrinsic viscosity of polyester resin | 0.80 | 0.80 | 0.80 |
| Melt viscosity ratio (polyamide resin/polyester resin) | 1.0 | 1.0 | 1.0 |
| Test results |  |  |  |
| polyamide mean dispersed particle size in parison body (μm) | 0.44 | 0.41 | 0.40 |
| haze of bottle body (%) | 16.3 | 13.5 | 13.4 |
| YI of bottle body | 13.2 | 14.2 | 13.9 |
| oxygen transmission rate of bottle (cc/bottle · day · 0.21 atm) | 0.020 | 0.020 | 0.020 |

|  | Reference Example 3 | Comparative Example 21 | Comparative Example 22 |
|---|---|---|---|
| Polyester resin composition (wt. %) |  |  |  |
| polyamide resin | 5.00 | 5.00 | 5.00 |
| polyester resin | 94.95 | 94.95 | 94.95 |
| polycarboxylic acid compound |  |  |  |
| TMAn | 0.05 | 0.05 | 0.05 |
| TMA | — | — | — |
| PAn | — | — | — |
| PMDA | — | — | — |
| Production method for polyester resin composition | MB | MB | MB |
| Master batch composition (wt. %) |  |  |  |
| polyamide resin | — | 20.00 | 20.00 |
| polyester resin | 99.75 | 79.80 | 79.80 |
| polycarboxylic acid compound | 0.25 | 0.20 | 0.20 |
| Polyamide resin | PA1 | PA4 | PA6 |
| terminal amino group concentration a (μeq/g) | 21 | 64 | 24 |
| terminal carboxyl group concentration b (μeq/g) | 62 | 17 | 28 |
| formula (2) a + b (μeq/g) | 83 | 81 | 52 |
| Relative viscosity of polyamide resin | 2.64 | 2.65 | 3.82 |
| Intrinsic viscosity of polyester resin | 0.80 | 0.80 | 0.80 |
| Melt viscosity ratio (polyamide resin/polyester resin) | 1.0 | 1.0 | 3.3 |
| Test results |  |  |  |
| polyamide mean dispersed particle size in parison body (μm) | 0.49 | 0.24 | 0.36 |
| haze of bottle body (%) | 14.5 | 7.7 | 16.5 |
| YI of bottle body | 13.5 | 16.9 | 12.9 |
| oxygen transmission rate of bottle (cc/bottle · day · 0.21 atm) | 0.020 | 0.021 | 0.022 |

MB*: master batch system.
DB*: direct batch system.

TABLE 13

|  | Comparative Example 23 | Reference Example 4 | Comparative Example 24 |
|---|---|---|---|
| Polyester resin composition (wt. %) |  |  |  |
| polyamide resin | 5.00 | 1.00 | 35.00 |
| polyester resin | 94.95 | 98.99 | 64.65 |
| polycarboxylic acid compound |  |  |  |
| TMAn | 0.05 | 0.01 | 0.35 |
| TMA | — | — | — |
| PAn | — | — | — |
| PMDA | — | — | — |
| Production method for polyester resin composition | MB* | MB | MB |

TABLE 13-continued

| Master batch composition (wt. %) | | | |
|---|---|---|---|
| polyamide resin | 20.00 | 20.00 | 35.00 |
| polyester resin | 79.80 | 79.80 | 64.65 |
| polycarboxylic acid compound | 0.20 | 0.20 | 0.35 |
| Polyamide resin | PA7 | PA1 | PA1 |
| terminal amino group concentration a (μeq/g) | 37 | 21 | 21 |
| terminal carboxyl group concentration b (μeq/g) | 132 | 62 | 62 |
| formula (2) a + b (μeq/g) | 169 | 83 | 83 |
| Relative viscosity of polyamide resin | 1.83 | 2.64 | 2.64 |
| Intrinsic viscosity of polyester resin | 0.80 | 0.80 | 0.80 |
| Melt viscosity ratio (polyamide resin/polyester resin) | 0.1 | 1.0 | 1.0 |
| Test results | | | |
| polyamide mean dispersed particle size in parison body (μm) | 0.42 | 0.19 | 0.37 |
| haze of bottle body (%) | 15.3 | 2.5 | 21.0 |
| YI of bottle body | 14.2 | 4.8 | 25.6 |
| oxygen transmission rate of bottle (cc/bottle · day · 0.21 atm) | 0.023 | 0.038 | 0.007 |

| | Reference Example | | |
|---|---|---|---|
| | 5 | 6 | 7 |
| Polyester resin composition (wt. %) | | | |
| polyamide resin | 5.00 | 5.00 | 5.00 |
| polyester resin | 94.95 | 94.95 | 94.95 |
| polycarboxylic acid compound | | | |
| TMAn | — | 0.05 | 0.05 |
| TMA | — | — | — |
| PAn | — | — | — |
| PMDA | 0.05 | — | — |
| Production method for polyester resin composition | MB | MB | MB |
| Master batch composition (wt. %) | | | |
| polyamide resin | 20.00 | 50.00 | 80.00 |
| polyester resin | 79.80 | 49.50 | 19.20 |
| polycarboxylic acid compound | 0.20 | 0.50 | 0.80 |
| Polyamide resin | PA1 | PA1 | PA1 |
| terminal amino group concentration a (μeq/g) | 21 | 21 | 21 |
| terminal carboxyl group concentration b (μeq/g) | 62 | 62 | 62 |
| formula (2) a + b (μeq/g) | 83 | 83 | 83 |
| Relative viscosity of polyamide resin | 2.64 | 2.64 | 2.64 |
| Intrinsic viscosity of polyester resin | 0.80 | 0.80 | 0.80 |
| Melt viscosity ratio (polyamide resin/polyester resin) | 1.0 | 1.0 | 1.0 |
| Test results | | | |
| polyamide mean dispersed particle size in parison body (μm) | 0.22 | 0.36 | 0.39 |
| haze of bottle body (%) | 8.2 | 11.5 | 12.5 |
| YI of bottle body | 14.7 | 10.2 | 9.6 |
| oxygen transmission rate of bottle (cc/bottle · day · 0.21 atm) | 0.022 | 0.022 | 0.021 |

MB*: master batch system.

Example 27

The preliminary master batch obtained in Example 17 and polyethylene terephthalate resin were dry-blended in a ratio of 25/75% by weight, and melt-kneaded into a film according to a T-die method, in which the cylinder temperature was from 270 to 290° C., the T-die temperature was 280° C., the screw speed was 100 rpm and the cooling roll temperature was 70° C., thereby producing an unstretched sheet having a width of 120 mm and a thickness of about 0.3 mm. Next, using a tenter-type biaxial stretcher by Toyo Seiki, the unstretched sheet was preheated at 90 to 110° C. for 30 seconds and then biaxially-stretched in the machine direction and in the cross direction both at a draw ratio of 3.5 times, at a linear stretching speed of 60%/sec, thereby giving a stretched film having a thickness of 20 μm. Thus obtained, the unstretched sheet had a haze of 0.5% and YI of 1.4, and the stretched film had a haze of 0.6% and YI of 1.9 and its oxygen transmission coefficient was 0.95 cc·mm/m$^2$·day·atm (23° C., 60% RH).

Reference Example 8

An unstretched sheet and a stretched film were produced under the same condition as in Example 27 but dry-blending the ingredient in a ratio of polyamide resin (PA1)/polyethylene terephthalate/polycarboxylic acid compound (TMAn)= 5/94.95/0.05% by weight. Thus obtained, the unstretched sheet had a haze of 6.5% and YI of 3.2, and the stretched film had a haze of 5.8% and YI of 4.5 and its oxygen transmission coefficient was 0.96 cc·mm/m$^2$·day·atm (23° C., 60% RH).

Example 28

Master batch pellets (moisture content, 130 ppm) were prepared in the same manner as in Example 17.

| Polyamide resin | |
|---|---|
| relative viscosity | 2.65 |
| melt viscosity (Pa · s) | 500 |
| Polyester resin | |
| intrinsic viscosity (dl/g) | 0.84 |
| Composition (% by weight) | |
| polyamide resin | 20.0 |
| polyester resin | 79.8 |
| polycarboxylic acid compound | 0.2 |
| Melt viscosity ratio (polyamide resin/polyester resin) | 1.0 |
| Melt viscosity x (Pa · s) | 130 |

25% by weight of the master batch pellets were dry-blended with 75% by weight of a polyester resin for dilution, polyethylene terephthalate resin (Nippon Unipet's trade name, UNIPET, grade RT553C, moisture content 90 ppm) in a tumbler to prepare a polyester resin composition.

| Polyester resin for dilution | |
|---|---|
| intrinsic viscosity (dl/g) | 0.84 |
| melt viscosity y (Pa · s) | 500 |
| x/y | 0.26 |
| Composition (% by weight) | |
| polyamide resin | 5.00 |
| polyester resin | 94.95 |
| polycarboxylic acid compound | 0.05 |

The polyester resin composition was injection-molded in an injection-molding device (Meiki Seisakusho's M200PDM-MJ) to give a parison having a length of 96 mm, a wall thickness of 4.0 mm, an outer diameter of 22.5 mm and a weight of 27 g. The injection molding condition was as follows: The resin temperature was 280° C., the mold temperature was 15° C., and the screw speed was 150 rpm. The body of the obtained parison was observed with an electronic microscope. The mean dispersed particle size of the polyamide resin in a cross section of about 19 μm² of the sample was 0.18 μm.

The obtained parison was processed for biaxial-stretch blow molding, using a blow-molding device (Frontier's EFB1000ET), to give a biaxially-stretched blow bottle having a height of 223 mm, a body diameter of 65 mm, a capacity of 500 mL and a mean thickness of about 300 μm. The obtained bottle was colored little, and had good transparency and gas barrier properties.

Test Results:

| | |
|---|---|
| haze of bottle body (%) | 5.5 |
| YI of bottle body | 8.7 |
| oxygen transmission rate of bottle | 0.020 cc/bottle · day · 0.21 atm |

Example 29

A parison and a stretch blow bottle were produced under the same condition as in Example 28, for which, however, polyethylene terephthalate resin (Nippon Unipet's trade name UNIPET, grade RT580CA (moisture content 150 ppm)) was used as the polyester resin for dilution. The obtained bottle was colored little and had good transparency and gas barrier properties.

| Master batch | |
|---|---|
| Polyamide resin | |
| relative viscosity | 2.65 |
| melt viscosity (Pa · s) | 500 |
| Polyester resin | |
| intrinsic viscosity (dl/g) | 0.84 |
| Composition (% by weight) | |
| polyamide resin | 20.0 |
| polyester resin | 79.8 |
| polycarboxylic acid compound | 0.2 |
| Melt viscosity ratio (polyamide resin/polyester resin) | 1.0 |
| Melt viscosity x (Pa · s) | 130 |
| Polyester resin composition | |
| polyester resin for dilution | |
| intrinsic viscosity (dl/g) | 1.17 |
| melt viscosity y (Pa · s) | 650 |
| x/y | 0.20 |
| composition (% by weight) | |
| polyamide resin | 5.00 |
| polyester resin | 94.95 |
| polycarboxylic acid compound | 0.05 |

Test Results:

| | |
|---|---|
| polyamide mean dispersed particle size in parison body (μm) | 0.15 |
| haze of bottle body (%) | 5.2 |
| YI of bottle body | 8.4 |
| oxygen transmission rate of bottle | 0.019 cc/bottle · day · 0.21 atm |

Example 30

A parison and a stretch blow bottle were produced under the same condition as in Example 28, for which, however, polyethylene terephthalate resin (Nippon Unipet's trade name UNIPET, grade RT580CA (moisture content 150 ppm)) was used in preparing the master batch. The obtained bottle was colored little and had good transparency and gas barrier properties.

| Master batch | |
|---|---|
| Polyamide resin | |
| relative viscosity | 2.65 |
| melt viscosity (Pa · s) | 500 |
| Polyester resin | |
| intrinsic viscosity (dl/g) | 1.17 |
| Composition (% by weight) | |
| polyamide resin | 20.0 |
| polyester resin | 79.8 |
| polycarboxylic acid compound | 0.2 |
| Melt viscosity ratio (polyamide resin/polyester resin) | 0.8 |
| Melt viscosity x (Pa · s) | 150 |
| Polyester resin composition | |
| polyester resin for dilution | |
| intrinsic viscosity (dl/g) | 0.84 |
| melt viscosity y (Pa · s) | 500 |
| x/y | 0.30 |

-continued

| composition (% by weight) | |
|---|---|
| polyamide resin | 5.00 |
| polyester resin | 94.95 |
| polycarboxylic acid compound | 0.05 |

Test Results:

| | |
|---|---|
| polyamide mean dispersed particle size in parison body (μm) | 0.19 |
| haze of bottle body (%) | 5.3 |
| YI of bottle body | 9.5 |
| oxygen transmission rate of bottle | 0.020 cc/bottle · day · 0.21 atm |

Example 31

The following polyester resin, polyamide resin and polycarboxylic acid compound were mixed in a tumbler, and melt-kneaded in a twin-screw extruder at an extrusion temperature of 280° C. and an extrusion speed of 15 kg/hr, while the pressure in the extruder cylinder was reduced with a vacuum pump, and the extruded strands were pelletized into pellets.
Polyester resin: 80 parts by weight of dry pellets of polyethylene terephthalate resin (Invista's grade 1101E, intrinsic viscosity 0.80 dl/g),
Polyamide resin: 20 parts by weight of MX nylon (Mitsubishi Gas Chemical's grade S6007, relative viscosity 2.65), 0.2 parts by weight of trimellitic acid dianhydride (TMAn).

The obtained pellets were dried in vacuum at 150° C. for 6 hours, thereby giving a resin composition (preliminary master batch). 25 parts by weight of the preliminary master batch pellets and 75 parts by weight of dry pellets of polyethylene terephthalate resin (grade: 1101E) were dry-blended, and the mixture was injection-molded in an injection-molding device (Meiki Seisakusho's M200PDM-MJ) to give a parison having a length of 96 mm, a wall thickness of 4.0 mm, an outer diameter of 22.5 mm and a weight of 27 g. The dispersed particle size of the polyamide resin in a test sample having a length of about 5.0 μm and a width of about 3.8 μm (area of about 19 μm$^2$), as cut out from the body of the parison, was measured. The parison was processed for biaxial-stretch blow molding, using a blow-molding device (Frontier's EFB1000ET), to give a biaxially-stretched blow bottle having a height of 223 mm, a body diameter of 65 mm, a capacity of 500 mL and a mean thickness of about 300 μm. The results are shown in Table 14.

Example 32

A parison and a biaxially-stretched hollow container were produced under the same condition as in Example 31, for which, however, the injection speed was 100 m/sec. The results are shown in Table 14.

Example 33

A parison and a biaxially-stretched hollow container were produced under the same condition as in Example 31, for which, however, the back pressure was 2.8 MPa. The results are shown in Table 14.

Example 34

A parison and a biaxially-stretched hollow container were produced under the same condition as in Example 31, for which, however, the back pressure was 3.5 MPa, the screw speed was 100 rpm and the injection speed was 125 cc/sec. The results are shown in Table 14.

Reference Example 9

A parison and a biaxially-stretched hollow container were produced under the same condition as in Example 31, for which, however, the back pressure was 1.0 MPa and the injection speed was 30 cc/sec. The results are shown in Table 14.

[Table 16]

TABLE 14

| | Example | | | | Reference |
|---|---|---|---|---|---|
| | 31 | 32 | 33 | 34 | Example 9 |
| Resin | | | | | |
| PET (wt. pt.) | 95 | 95 | 95 | 95 | 95 |
| MX nylon (wt. pt.) | 5 | 5 | 5 | 5 | 5 |
| TMAn (wt. pt.) | 0.05 | 0.05 | 0.05 | 0.05 | 0.05 |
| Mixing method | MB* | MB* | MB* | MB* | MB* |
| Injection condition | | | | | |
| back pressure (MPa) | 4.0 | 4.0 | 2.8 | 3.5 | 1.0 |
| screw speed (rpm) | 150 | 150 | 150 | 100 | 150 |
| injection speed (cc/sec) | 155 | 100 | 155 | 125 | 30 |
| resin temperature (° C.) | 280 | 280 | 280 | 280 | 280 |
| mold temperature (° C.) | 15 | 15 | 15 | 15 | 15 |
| Dispersed particle size | | | | | |
| mean diameter (μm) | 0.088 | 0.11 | 0.12 | 0.13 | 0.22 |
| proportion of ±0.05 μm particles (%) | 95.7 | 86.3 | 66.0 | 70.9 | 44.3 |
| Bottle Haze (%) | 5.1 | 6.4 | 5.7 | 5.6 | 8.0 |

MB*: master batch system.

[Industrial Applicability]

The polyester resin composition of the invention has good shapability, and the shaped article obtained from it has practically sufficient gas barrier properties and mechanical properties, and it is colored little and its transparency is improved. The shaped article is extremely useful as packing materials for foods, drinks, chemicals, electronic parts, etc., and the industrial value of the invention is high.

The invention claimed is:
1. A polyester resin composition comprising:
from 2 to 30% by weight of a polyamide resin (A) containing diamine constitutive units and dicarboxylic acid constitutive units, in which at least 70 mol % of the diamine constitutive units is derived from metaxylylenediamine and at least 70 mol % of the dicarboxylic acid constitutive units is derived from adipic acid; from 69.5 to 97.99% by weight of the sum of the amount of a polyester resin (B) and of a polyester resin (B'), each of the polyester resin (B) and the polyester resin (B') containing diol constitutive units and dicarboxylic acid constitutive units, in which at least 70 mol % of the dicarboxylic acid constitutive units of the polyester resin (B) and of the polyester resin (B') is derived from an aromatic dicarboxylic acid and at least 70 mol% of the diol constitutive units is derived from an aliphatic diol; and from 0.01 to 0.5% by weight of a polycarboxylic acid compound (C) comprising at least one tricarboxylic acid compound selected from the group consisting of aromatic tricarboxylic acids, alicyclic tricarboxylic acids and acid anhydrides of those tricarboxylic acids, and/or at least one dicarboxylic acid compound selected from the group consisting of aromatic dicarboxylic acids, alicyclic dicarboxylic acids and acid anhydrides of those dicarboxylic acids (provided that the total of the contents of the ingredients (A), (B), (B'), and (C) in the polyester resin composition is 100% by weight), and satisfying the following formulae (1) to (4):

$$a \leq b \quad (1)$$

$$60 \leq a+b \leq 150 \quad (2)$$

$$1 \leq c \times Cc \leq 20 \quad (3)$$

$$1 \leq c \times Cc/(a \times Ca) \leq 12 \quad (4)$$

(wherein "a" represents the concentration of the terminal amino group of the polyamide resin (A) (μequivalent/g); "b" represents the concentration of the terminal carboxyl group of the polyamide resin (A) (μequivalent/g); "c" represents the concentration of the carboxyl group in the polycarboxylic acid compound (C) (μequivalent/g), provided that one equivalent of acid anhydride group is calculated as 2 equivalents of carboxyl group; "Cc" represents the concentration of the polycarboxylic acid compound (C) in the polyester resin composition (g/g); and "Ca" represents the concentration of the polyamide resin (A) in the polyester resin composition (g/g)), the polyester resin composition having been prepared by mixing (I) a preliminary resin composition comprising from 10 to 40% by weight of the polyamide resin (A), from 89.95 to 59.00% by weight of the polyester resin (B) and from 0.05 to 1% by weight of the polycarboxylic acid compound (C), the total % by weight of the ingredients (A), (B) and (C) in the preliminary resin composition being 100% by weight, with (II) the polyester resin (B'), so as to provide the polyester resin composition having from 2 to 30% by weight of the polyamide resin (A), from 69.5 to 97.99% by weight of the sum of the amount of (1) the polyester resin (B) and (2) the polyester resin (B'), and from 0.01 to 0.5% by weight of the polycarboxylic acid compound (C), the polyamide resin (A) being finely dispersed in the polyester resin composition.

2. The polyester resin composition as claimed in claim 1, wherein the polyamide resin (A) is a solid-phase polymerization polyamide resin having a relative viscosity of from 2.30 to 4.20 that is obtained through additional solid-phase polymerization of a melt polymerization polyamide resin obtained from a diamine providing the diamine constitutive units and a dicarboxylic acid providing the dicarboxylic acid constitutive units of the polyamide resin (A) and having a relative viscosity of from 1.83 to 2.28.

3. The polyester resin composition as claimed in claim 1, which is prepared by melt-kneading a mixture comprising from 5 to 50% by weight of the preliminary resin composition and from 50 to 95% by weight of the polyester resin (B'), the total weight of the preliminary resin composition and the polyester resin (B') being 100% by weight.

4. The polyester resin composition as claimed in claim 1, wherein the polyamide resin (A) is polymetaxylylenadipamide.

5. The polyester resin composition as claimed in claim 1, wherein each of the polyester resin (B) and the polyester resin (B') is at least one resin selected from polyethylene terephthalate resin, polyethylene terephthalate/isophthalate copolymer resin, polyethylene/1,4-cyclohexanedimethylene terephthalate copolymer resin, polybutylene terephthalate resin, and polyethylene 2,6-naphthalenedicarboxylate resin.

6. The polyester resin composition as claimed in claim 1, wherein the tricarboxylic acid compound is at least one compound selected from the group consisting of trimellitic acid and trimellitic acid anhydride.

7. The polyester resin composition as claimed in claim 1, wherein the dicarboxylic acid compound is at least one compound selected from the group consisting of phthalic acid and phthalic anhydride.

8. The polyester resin composition as claimed in claim 1, wherein melt viscosity of polyamide resin (A)/melt viscosity of polyester resin (B) is from 0.3 to 1.2.

9. A shaped article obtained by shaping the polyester resin composition of claim 1.

10. The shaped article as claimed in claim 9, which is a biaxially-stretched hollow container obtained by preparing a parison through injection molding of the polyester resin composition under the following condition (a) to (e):
(a) resin temperature of from 260 to 290° C.,
(b) screw back pressure of from 2.5 to 5.0 MPa,
(c) screw speed of from 80 to 250 rpm,
(d) injection speed of from 80 to 180 cc/sec, and
(e) mold temperature of from 10 to 25° C., and processing the parison in a mode of biaxial-stretch blow molding.

11. The polyester resin composition as claimed in claim 1, wherein said polyester resin (B') is a different polyester resin than the polyester resin (B).

12. The polyester resin composition as claimed in claim 11, wherein the polyester resin (B') and the preliminary resin composition satisfy the following formulae (5) and (6):

$$100 \leq x \leq 250 \quad (5)$$

$$0.1 \leq x/y \leq 0.5 \quad (6)$$

(wherein x represents the melt viscosity of the preliminary resin composition measured at 270° C. and at a shear rate of 100/sec (Pa·s); and y represents the melt viscosity of the polyester resin (B') measured at 270° C. and at a shear rate of 100/sec (Pa·s)).

13. The polyester resin composition as claimed in claim 1, wherein said polyester resin (B') is the same polyester resin as the polyester resin (B).

14. The polyester resin composition as claimed in claim 1, which includes the polycarboxylic acid compound (C) in an amount of 0.01 to 0.07% by weight.

15. A method for producing a polyester resin composition comprising (I) a step of preparing a preliminary composition (i) by melt-kneading from 10 to 40% by weight of a polyamide resin (A) containing diamine constitutive units and dicarboxylic acid constitutive units, in which at least 70 mol % of the diamine constitutive units is derived from metaxylylenediamine and at least 70 mol % of the dicarboxylic acid constitutive units is derived from adipic acid, from 59.00 to 89.95% by weight of a polyester resin (B), containing dicarboxylic acid constitutive units and diol constitutive units, in which at least 70 mol % of the dicarboxylic acid constitutive units of the polyester resin (B) is derived from an aromatic dicarboxylic acid and at least 70 mol % of the diol constitutive units is derived from an aliphatic diol, and from 0.05 to 1% by weight of a polycarboxylic acid compound (C) comprising at least one tricarboxylic acid compound selected from the group consisting of aromatic tricarboxylic acids, alicyclic tricarboxylic acids and acid anhydrides of those tricarboxylic acids, and/or at least one dicarboxylic acid compound selected from the group consisting of aromatic dicarboxylic acids, alicyclic dicarboxylic acids and acid anhydrides of those dicarboxylic acids (provided that the total of the contents of the ingredients (A), (B) and (C) of the preliminary composition is 100% by weight), or (ii) by melt-kneading a polyamide resin (A) containing diamine constitutive units and dicarboxylic acid constitutive units, in which at least 70 mol % of the diamine constitutive units is derived from metaxylylenediamine and at least 70 mol % of the dicarboxylic acid constitutive units is derived from adipic acid, and a polycarboxylic acid compound (C) comprising at least one tricarboxylic acid compound selected from the group consisting of aromatic tricarboxylic acids, alicyclic tricarboxylic acids and acid anhydrides of those tricarboxylic acids, and/or at least one dicarboxylic acid compound selected from the group consisting of aromatic dicarboxylic acids, alicyclic dicarboxylic acids and acid anhydrides of those dicarboxylic acids (provided that the total of the contents of the ingredients (A) and (C) of the preliminary composition is 100% by weight); and (II) a step of melt-kneading the preliminary composition and a polyester resin (B'), wherein the polyester resin (B') contains dicarboxylic acid constitutive units and diol constitutive units, in which at least 70 mol % of the dicarboxylic acid constitutive units of the polyester resin (B') is derived from an aromatic dicarboxylic acid and at least 70 mol % of the diol constitutive units is derived from an aliphatic diol;

wherein the polyester resin composition comprises from 2 to 30% by weight of the polyamide resin (A); from 69.5 to 97.99% by weight of the sum of the amount of (1) the polyester resin (B) and (2) the polyester resin (B'); and from 0.01 to 0.5% by weight of the polycarboxylic acid compound (C) (provided that the total of the contents of the ingredients (A), (B), (B'), and (C) of the polyester resin composition is 100% by weight), and satisfies the following formulae (1) to (4):

$$a \leq b \tag{1}$$

$$60 \leq a+b \leq 150 \tag{2}$$

$$1 \leq c \times Cc \leq 20 \tag{3}$$

$$1 \leq c \times Cc/(a \times Ca) \leq 12 \tag{4}$$

(wherein "a" represents the concentration of the terminal amino group of the polyamide resin (A) (μequivalent/g);

"b" represents the concentration of the terminal carboxyl group of the polyamide resin (A) (μequivalent/g);

"c" represents the concentration of the carboxyl group in the polycarboxylic acid compound (C) (μequivalent/g), provided that one equivalent of acid anhydride group is calculated as 2 equivalents of carboxyl group;

"Cc" represents the concentration of the polycarboxylic acid compound (C) in the polyester resin composition (g/g); and "Ca" represents the concentration of the polyamide resin (A) in the polyester resin composition (g/g)); and wherein the polyamide resin (A) is finely dispersed in the polyester resin composition.

16. The method for producing the polyester resin composition as claimed in claim 15, wherein the preliminary composition is prepared (i) by melt-kneading from 10 to 40% by weight of said polyamide resin (A), from 59.00 to 89.95% by weight of said polyester resin (B), and from 0.05 to 1% by weight of said polycarboxylic acid compound (C) (provided that the total of the contents of the ingredients (A), (B) and (C) of the preliminary composition is 100% by weight).

17. The method for producing the polyester resin composition as claimed in claim 15, wherein the polyester resin composition produced includes the polycarboxylic acid compound (C) in an amount of 0.01 to 0.07% by weight.

* * * * *